US007590810B2

(12) United States Patent
Matsui et al.

(10) Patent No.: US 7,590,810 B2
(45) Date of Patent: Sep. 15, 2009

(54) METHOD AND COMPUTER NETWORK FOR COPYING A VOLUME OF A STORAGE SUBSYSTEM WITH IMPROVED ARRANGEMENT FOR HANDLING UPDATE REQUESTS

(75) Inventors: Akira Matsui, Yokohama (JP); Hiroshi Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 173 days.

(21) Appl. No.: 11/330,347

(22) Filed: Jan. 12, 2006

(65) Prior Publication Data

US 2007/0106854 A1 May 10, 2007

(30) Foreign Application Priority Data

Nov. 7, 2005 (JP) ............................. 2005-322195

(51) Int. Cl.
*G06F 12/16* (2006.01)
*G06F 13/14* (2006.01)

(52) U.S. Cl. ...................................................... 711/162
(58) Field of Classification Search ................. 711/162, 711/152
See application file for complete search history.

(56) References Cited

U.S. PATENT DOCUMENTS

| 6,408,370 | B2 | 6/2002 | Yamamoto et al. | |
| 6,898,685 | B2 | 5/2005 | Meiri et al. | |
| 7,246,187 | B1* | 7/2007 | Ezra et al. | 710/200 |
| 2003/0120878 | A1* | 6/2003 | Andreassen et al. | 711/152 |
| 2004/0030837 | A1* | 2/2004 | Geiner et al. | 711/133 |
| 2004/0034808 | A1* | 2/2004 | Day et al. | 714/6 |
| 2004/0172509 | A1* | 9/2004 | Takeda et al. | 711/162 |
| 2004/0193945 | A1* | 9/2004 | Eguchi et al. | 714/6 |
| 2005/0033827 | A1* | 2/2005 | Yamagami | 709/219 |
| 2005/0071710 | A1* | 3/2005 | Micka et al. | 714/6 |
| 2006/0106747 | A1* | 5/2006 | Bartfai et al. | 707/1 |
| 2006/0146848 | A1* | 7/2006 | Kirstein et al. | 370/412 |
| 2006/0212668 | A1* | 9/2006 | Furukawa et al. | 711/162 |

FOREIGN PATENT DOCUMENTS

JP 11-085408 3/1999

* cited by examiner

*Primary Examiner*—Matt Kim
*Assistant Examiner*—Hal Schnee
(74) *Attorney, Agent, or Firm*—Antonelli, Terry, Stout & Kraus, LLP.

(57) ABSTRACT

Data is updated while making sure that one logically meaningful data group is set as the unit of data update. A host computer requests a first disk controller a data input/output request to/from a logical volume of a first disk drive. When the request is an update request, requested update data is stored in the first logical volume, by a first control. The update request is sent to a second disk controller and is temporarily accumulated there, when information indicating a group to which the update data belongs is attached to the update request. When the first disk controller finishes executing every data input/output request that is designated by information indicating to which group the update data belongs, the accumulated update data for those belonging to the same group to which group update data belongs is retrieved and stored in a second logical volume.

20 Claims, 32 Drawing Sheets

206

| DATA CONFIGURATION INFORMATION | DATA ID | | |
|---|---|---|---|
| | DATA CONFIGURATION FORMAT INFORMATION | DATA FORMAT ONE | |
| | UNIQUE INFORMATION | AREA A INFORMATION | AREA HEAD ADDRESS — 351 |
| | | | AREA LENGTH — 352 |
| | | AREA B INFORMATION | AREA HEAD ADDRESS |
| | | | AREA LENGTH |
| | | AREA C INFORMATION | AREA HEAD ADDRESS |
| | | | AREA LENGTH |
| | | AUXILIARY AREA | |

EXAMPLE OF DATA CONFIGURATION INFORMATION 206

FIG. 4B

UPDATE DATA GROUP ID 259

UPDATE DATA INFORMATION 1303

METHOD AND COMPUTER NETWORK FOR COPYING A VOLUME OF A STORAGE SUBSYSTEM WITH IMPROVED ARRANGEMENT FOR HANDLING UPDATE REQUESTS

CLAIM OF PRIORITY

The present application claims priority from Japanese application P2005-322195 filed on Nov. 7, 2005, the content of which is hereby incorporated by reference into this application.

BACKGROUND

This invention relates to a technique of remote copy between storage subsystems.

Lately, more and more computer systems are being run 24 hours a day, and are demanded to recover from a disaster in a shorter period of time. One of the technologies to meet the demand is remote copy, which does not use a computer in making a copy of a volume in a storage subsystem located on a remote site.

Remote copy enables a computer system to recover from a disaster quickly by switching from a primary volume (a volume from which data is copied) to a secondary volume (a volume to which data is copied) to resume service. A remote copy technique has been disclosed in JP 11-85408 A in which data is copied between different storage controllers without the intervention of a host computer.

SUMMARY

Remote copy does not at present guarantee data update per unit of input/output to/from a computer.

Accordingly, when an application program run on a computer attempts to update one logically meaningful piece of data in response to a plurality of update input/output requests and remote copy is interrupted during the update of the logically meaningful data, data in the secondary volume could be viewed as incorrect data from the application program. To resume service with the secondary volume having incorrect data, the secondary volume has to recover its data first using a journal of the application program.

Moreover, in the case where remote copy is interrupted during an update of volume management information, namely, information for managing files in a volume and information for managing the volume itself, it could result in destruction of files and destruction of information of the entire volume. This necessitates reconstruction of the whole secondary volume from a backup and subsequent recovery of data that has been created since the last backup with the use of a journal of an application program.

It is therefore an object of this invention to provide a technique for guaranteeing data update per unit of update of one logically meaningful piece of data in a secondary volume. To update volume management information and other information important to a system, existing application programs and OSs exclude relevant volumes from the beginning of the update until the end of the update. This invention presents a readily executable example in which update data groups are separated upon issuance of a volume exclusion instruction and exclusion cancellation instruction loaded in existing application programs and OSs.

An embodiment of this invention is characterized by including:

a first step of requesting the first disk controller a data input/output request to/from the logical volume of the first disk drive, by the host computer;

a second step of storing, when the input/output request is an update request, update data requested by the update request in the first logical volume, by the first control unit;

a third step of sending the update request to the second disk controller, by the first control unit;

a fourth step of temporarily accumulating, when information indicating to which group update data belongs is attached to the update request sent from the first control unit, the update data requested by the update request, by the second control unit; and a fifth step of retrieving, when the first disk controller finishes executing every data input/output request that is designated by the information indicating to which group update data belongs, the accumulated update data for those belonging to the same group according to the information indicating to which group update data belongs and storing the retrieved update data in the second logical volume, by the first control unit.

This invention makes it possible to maintain the consistency of data in a secondary volume viewed from an application irrespective of when remote copy is interrupted.

BRIEF DESCRIPTION OF THE DRAWINGS

FIG. 4B is an explanatory diagram showing an example of data configuration information according to the first embodiment of this invention.

DETAILED DESCRIPTION OF THE PREFERRED EMBODIMENTS

Embodiments of this invention will be described below with reference to the accompanying drawings. This invention is not limited to the following embodiments.

First Embodiment

Figure 1:
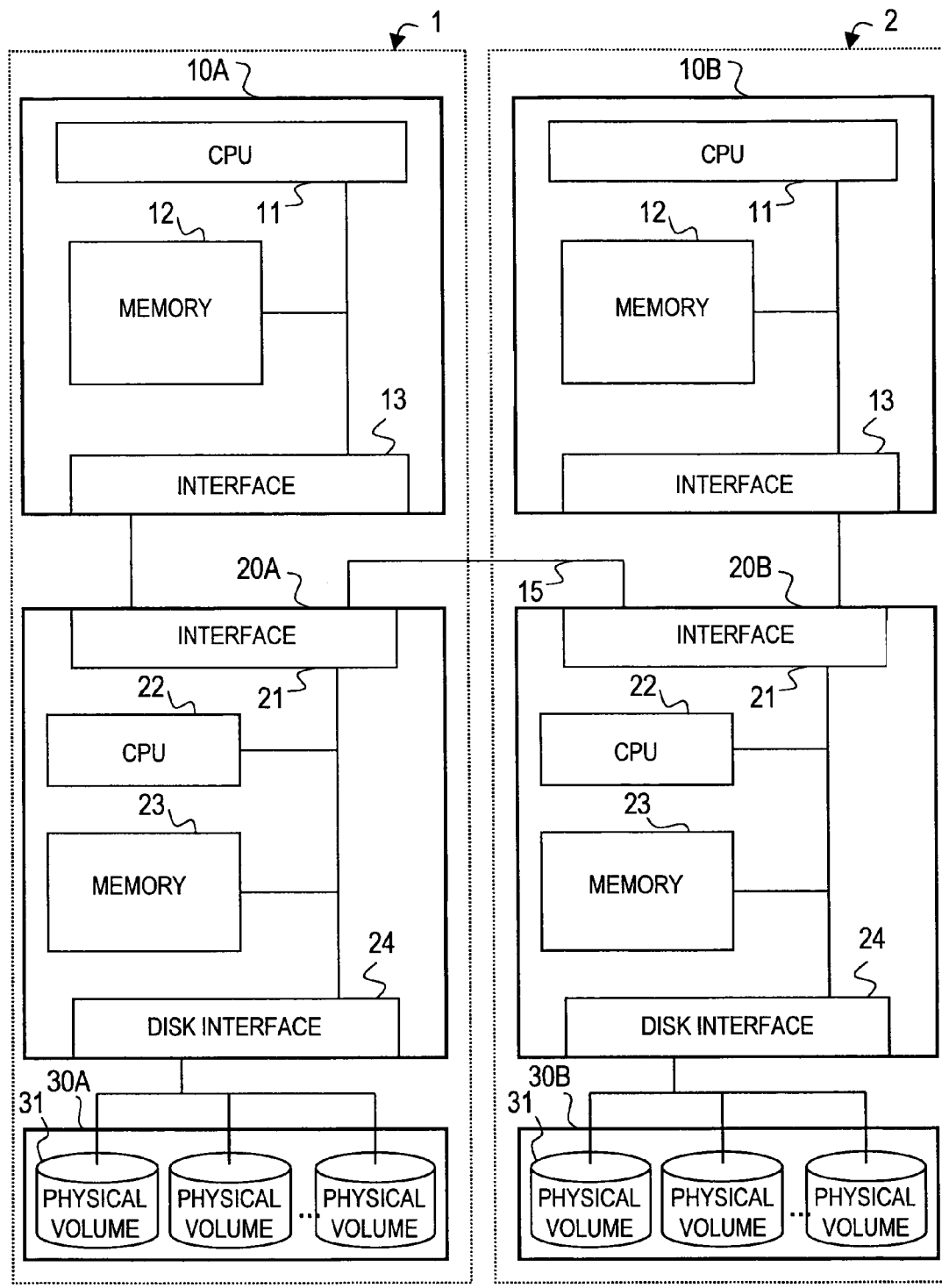
FIG. 1 is a configuration block diagram of a computer system according to a first embodiment of this invention.

FIG. 1 is a configuration block diagram of a computer system according to a first embodiment of this invention.

This computer system has a main site 1 and a remote site 2 which are connected by a network 15.

The main site 1 contains a host computer 10A, a disk controller 20A and a disk unit 30A. The remote site 2 contains a host computer 10B, a disk controller 20B and a disk unit 30B.

The host computer 10A requests the disk controller 20A to input/output data stored in the disk unit 30A. The disk controller 20A controls read/write of data stored in the disk unit 30A as requested by the host computer 10A.

Similarly, the host computer 10B requests the disk controller 20B to input/output data stored in the disk unit 30B. The disk controller 20B controls read/write of data stored in the disk unit 30B as requested by the host computer 10B.

The disk controller 20A executes processing of copying data that is stored in the disk unit 30A to the disk unit 30B via the disk controller 20B.

The host computer 10A contains a CPU 11, a memory 12 and an interface 13.

The CPU 11 executes a program or the like stored in the memory 12, to thereby execute processing prescribed in the program. The memory 12 stores a program run on the host computer 10A, data, and the like. The interface 13 transmits or receives data with the disk controller 20A.

The disk controller 20A contains an interface 21, a CPU 22, a memory 23 and a disk interface 24.

The interface 21 transmits or receives data with the host computer 10A or the disk controller 20B. The CPU 22 executes a program or the like stored in the memory 23, to thereby execute processing prescribed in the program. The memory 23 stores a program run on the disk controller 20A, data, and the like. The disk interface 24 transmits or receives data with the disk unit 30A. The interface 21 is connected to a network 15, which is connected to the disk controller 20B. The network 15 is a LAN (Local Area Network), a SAN (Storage Area Network), or the like.

The disk unit 30A contains a plurality of physical volumes 31. The physical volumes 31 constitute logical volumes.

The host computer 10B, the disk controller 20B and the disk unit 30B on the remote site 2 have almost the same configurations as the host computer 10A, the disk controller 20A and the disk unit 30A. The host computer 10B requests the disk controller 20B to input/output data stored in the disk unit 30B. The two sets of host computer, disk controller, and disk unit on the main and remote sites may be referred to as host computer 10, disk controller 20 and disk unit 30, respectively, when there is no particular need to distinguish one from the other.

Figure 2:
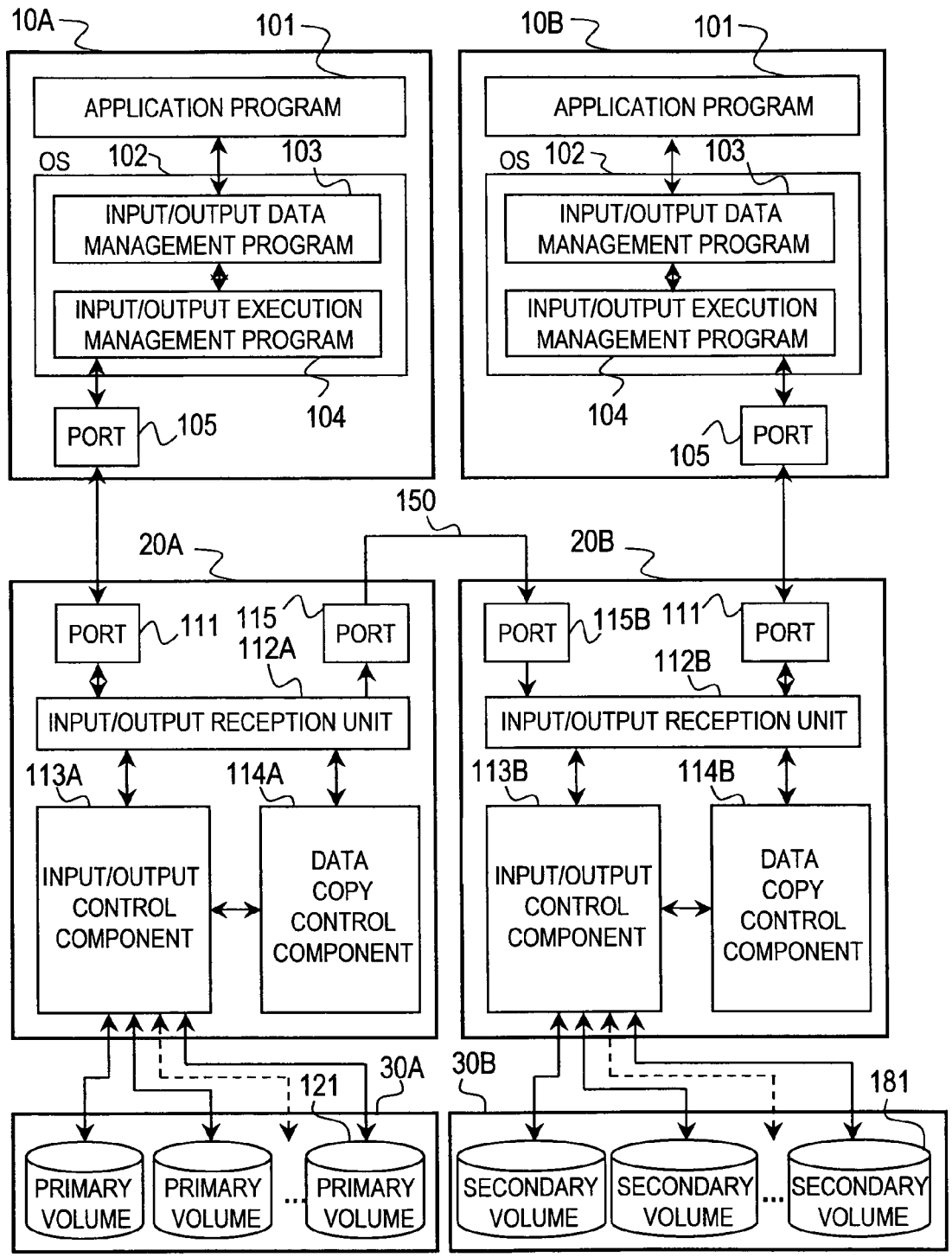
FIG. 2 is a function block diagram of the computer system according to the first embodiment of this invention.

FIG. 2 is a function block diagram of the computer system structured as described above.

An application program 101 and an OS 102 are run on the host computer 10A. The CPU 11 reads and executes the application program 101 and OS 102 stored in the memory 12 to carry out their functions as mentioned above.

The application program 101 requests input/output of files and data stored in logical volumes, which are set in the disk unit 30A. The OS 102 receives an input/output request from the application program 101, converts the request into an input/output request to the disk controller 20A, and sends the request to the disk controller 20A.

A port 105 is a logical connection path set between the interface 13 of the host computer 10A and the interface 21 of the disk controller 20A.

The OS 102 contains an input/output data management program 103 and an input/output execution management program 104. The programs 103 and 104 notify and set the state of a logical volume, make an exclusion request, and perform other input/output operations to the disk controller 20A according to an input/output request from the application program 101.

An input/output reception unit 112A, an input/output control component 113A and a data copy control component 114A are run on the disk controller 20A. The CPU 22 reads and executes programs stored in the memory 23 to carry out functions of the input/output reception unit 112A, the input/ output control component 113A and the data copy control component 114A as mentioned above.

The input/output reception unit 112A receives an input/output request sent from the host computer 10A, determines what is requested, and hands over processing of the request to the input/output control component 113A or the data copy control component 114A. The input/output control component 113A executes input/output of data to/from the disk unit 30A according to the received input/output request. The data copy control component 114A exerts control over data copy between the disk controller 20A and the disk controller 20B according to the received input/output request.

A port 111A is a logical connection path set between the interface 21 of the disk controller 20A and the interface 13 of the host computer 10A. A port 115A is a logical connection path set between the interface 21 of the disk controller 20A and the interface 21 of the disk controller 20B.

The disk unit 30A has a plurality of logical volumes set therein. Hereinafter, a logical volume set in the disk unit 30A on the main site 1 will be called a primary volume 121 whereas a logical volume set in the disk unit 30B on the remote site 2 will be called a secondary volume 181. Upon reception of a data write request from the host computer 10A, the disk controller 20A and the disk controller 20B perform processing of writing requested write data in the primary volume 121 and in the secondary volume 181 as well. This processing is hereinafter referred to as remote copy.

The host computer 10B and the disk controller 20B have almost the same configurations as the host computer 10A and the disk controller 20A.

Figure 3:
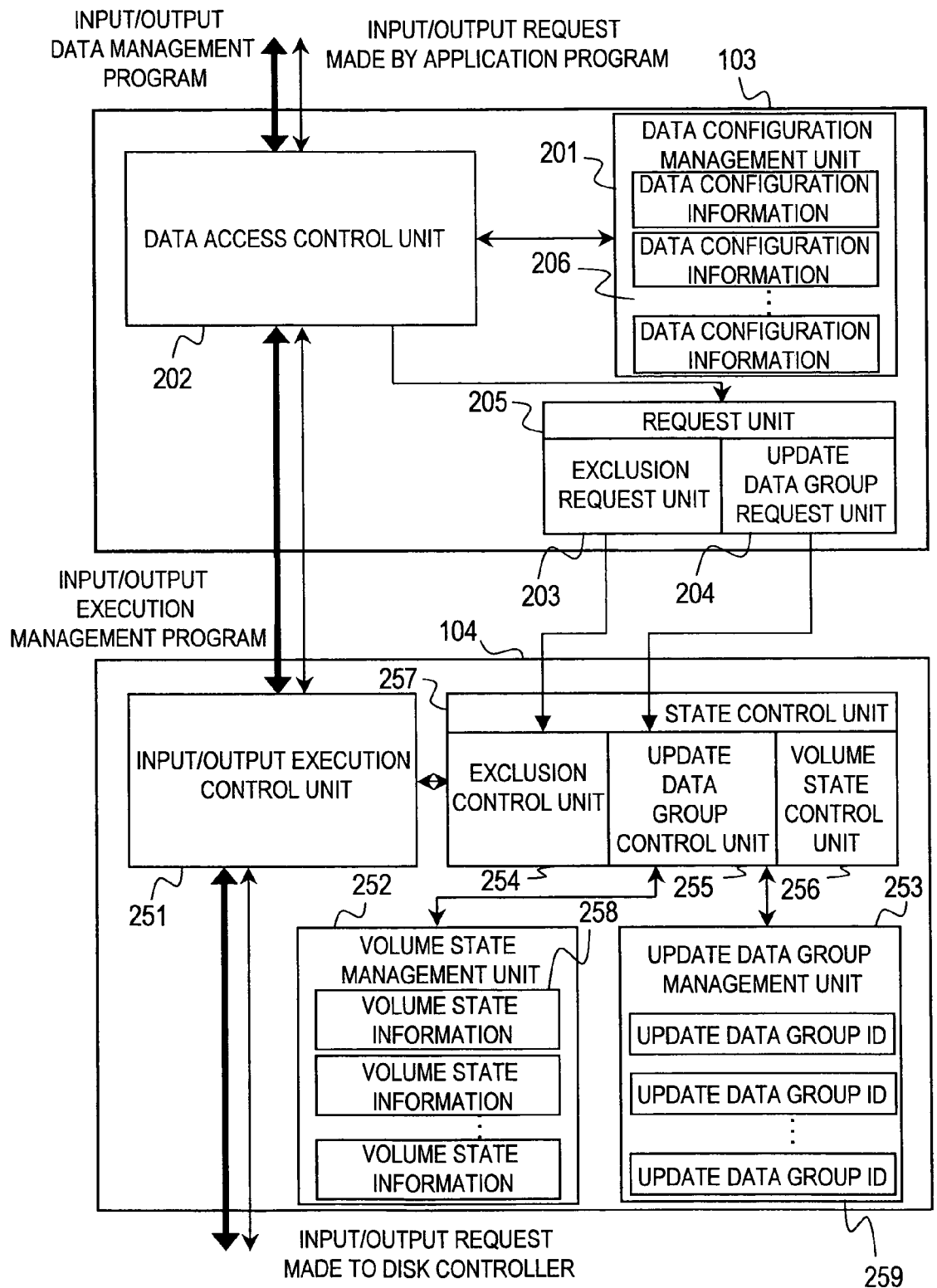
FIG. 3 is an explanatory diagram of an input/output data management program and input/output execution management program according to the first embodiment of this invention.

FIG. 3 is an explanatory diagram of the input/output data management program 103 and the input/output execution management program 104, which are contained in the OS 102 of the host computer 10.

The input/output data management program 103 contains a data configuration management unit 201, a data access control unit 202 and a request unit 205. The request unit 205 contains an exclusion request unit 203 and an update data group request unit 204.

The data configuration management unit 201 manages data configuration information 206, which is about the configuration of data stored in logical volumes by the host computer 10.

A volume state management unit 252 manages volume state information 258, which is about the state of logical volumes managed by the host computer 10. The volume state information 258 is in general made for each logical volume and managed as separate information pieces. However, information pieces of a plurality of logical volumes may be managed together as one piece of volume state information 258.

An update data group management unit 253 manages an update data group ID 259, which is used to identify an update data group and which is attached to an input/output request sent from the application program 101. The update data group ID 259 has to be unique throughout the computer system.

The data access control unit 202 receives an input/output request from its OS 102 or from the application program 101, and creates, from the data configuration information 206 of data requested to be inputted/outputted, a series of input/output commands to meet the input/output request furthermore, the data access control unit 202 instructs the exclusion request unit 203 to request logical volume exclusion/exclusion cancellation when logical volume exclusion/exclusion cancellation is judged as necessary furthermore, the data access control unit 202 issues an update data group registration instruction/registration cancellation instruction to the update data group request unit 204 when the application program 101 instructs the data access control unit 202 to treat the input/output request as an update data group or when it is judged that a created input/output command group has to be treated as an update data group.

The request unit 205 requests, in response to an instruction from the data access control unit 202, an exclusion control unit 254 and update data group control unit 255 of a state control unit 257 to exclude a volume or to cancel excluded the volume. And The request unit 205 requests the update data group control unit 255 to register an update data group or to cancel registered the update data group.

The input/output execution management program 104 contains an input/output execution control unit 251, the volume state management unit 252, the update data group management unit 253 and the state control unit 257. The state control unit 257 contains the exclusion control unit 254, the update data group control unit 255 and a volume state control unit 256.

The input/output execution control unit 251 attaches, according to information set in the volume state information 258, an exclusion command to an input/output command group created by the data access control unit 202. An exclusion command is attached when the exclusion control unit 254 gives an instruction to create an exclusion command. The input/output execution control unit 251 also attaches an update data group ID to the input/output command group. An update data group ID is attached when the update data group control unit 255 gives an instruction to attach an update data group ID. The input/output execution control unit 251 also attaches, to the input/output command group, other command groups (control command groups) necessary to control a volume. Then the input/output execution control unit 251 sends the input/output command group to the disk controller 20, to thereby execute input/output.

When a request to execute an exclusion cancellation command is received from the exclusion control unit 254, or when a request to execute a command for an update data group cancellation instruction is received from the update data group control unit 255, the input/output execution control unit 251 sends the request to the disk controller 20.

The exclusion control unit 254 makes a logical volume exclusion request or volume exclusion cancellation request, which is sent from the exclusion request unit 203, reflected on the volume state information 258. When there is a need to exclude a logical volume, the exclusion control unit 254 instructs, through the volume state information 258, the input/output execution control unit 251 to create an exclusion command and instructs the update data group control unit 255 to register an update data group. When there is a need to cancel logical volume exclusion, the exclusion control unit 254 creates an exclusion cancellation command, instructs the input/output execution control unit 251 to execute the exclusion cancellation command, and instructs the update data group control unit 255 to cancel update data group registration.

The update data group control unit 255 makes an update data group registration instruction/registration cancellation instruction, which is sent from the update data group request unit 204 or the exclusion control unit 254, reflected on the volume state information 258. When an update data group registration instruction necessitates registration of an update data group ID in the volume state information 258, the update data group control unit 255 obtains the update data group ID 259 that is not in use from an update data group ID table 259, and sets the obtained ID in the volume state information 258. When there is an update data group ID that is made unnecessary by an update data group registration cancellation instruction, the update data group control unit 255 returns the update data group ID to the update data group ID table 259. When it is judged that an input/output request with an update data group ID attached needs to be reflected on the secondary volume, the update data group control unit 255 creates a command for making the update data group reflected and instructs the input/output execution control unit 251 to execute the reflection command.

When the input/output execution control unit 251 requests to judge the executability of input/output, the volume state control unit 256 judges, from the volume state information 258 of a volume designated by the input/output request, whether the input/output request is executable or not. When the input/output execution control unit 251 requests to obtain volume state information, the volume state control unit 256 sends the volume state information 258 of a volume designated by the input/output request to the input/output execution control unit 251.

Figure 4A:
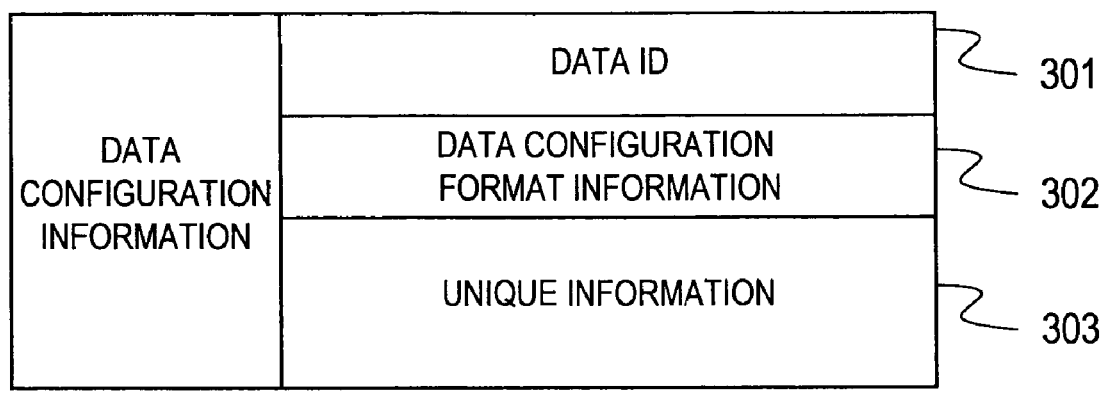
FIG. 4A is an explanatory diagram of data configuration information according to the first embodiment of this invention.

FIG. 4A is an explanatory diagram of the data configuration information 206.

The data configuration information 206 is created for each data unit by which the application 101 of the host computer 10 manages data, and is managed by the data configuration management unit 201.

The data configuration information 206 contains a data ID 301, data configuration format information 302 and unique information 303.

The data ID 301 indicates the identifier of data in question. The data configuration format information 302 is information indicating in what format the data in question is managed. The unique information 303 is information about an area in which the data in question is stored.

FIG. 4B is an explanatory diagram showing an example of information that is actually contained in the data configuration information 206.

The identifier of data in question is stored as the data ID 301.

The format of the data in question is stored as the data configuration format information 302. In the example of FIG. 4B, "Data Format One" is stored.

Written as the unique information 303 is information about an area in which the data in question is stored. It is common to divide data into sector-size pieces and store the pieces in logical volumes. In the example of FIG. 4B, data in question is divided between two areas, an area A and an area B. An area head address 351 and an area length 352 are stored for each area. The unique information 303 also indicates an auxiliary area secured in case another area is added to the data in question. An area for the data is added/deleted as necessary. When new data is added to the data due to an increase in data amount, an area C made from the auxiliary area is allocated to the data and the area head address 351 and the area length 352 are set for the area C.

Figure 4C:
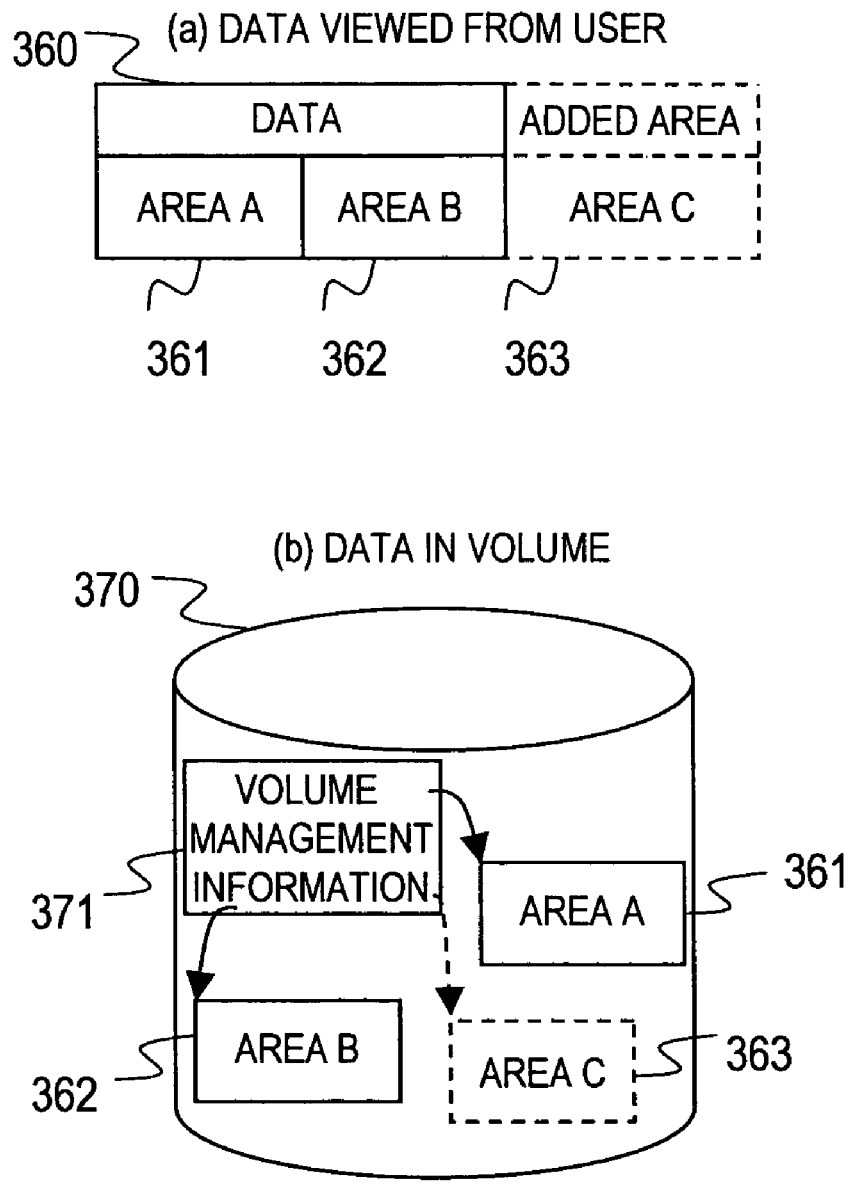
FIG. 4C is an explanatory diagram showing how data looks to users and where data is actually stored in a logical volume according to the first embodiment of this invention.

FIG. 4C is an explanatory diagram showing how data 360 looks to users and where the data is actually stored in a logical volume.

The data in the example of FIG. 4B is divided among a few areas and the areas are stored in a logical volume. The areas in the logical volume are managed as volume management information 371. On the other hand, to users (the application program 101 and the like), an area A 361 and area B 362 of this data look like continuous areas. When the area A 361 and the area B 362 are joined by an area C 363, area C information is added to data configuration information 350 and the volume management information 371 as described above.

Figure 5:
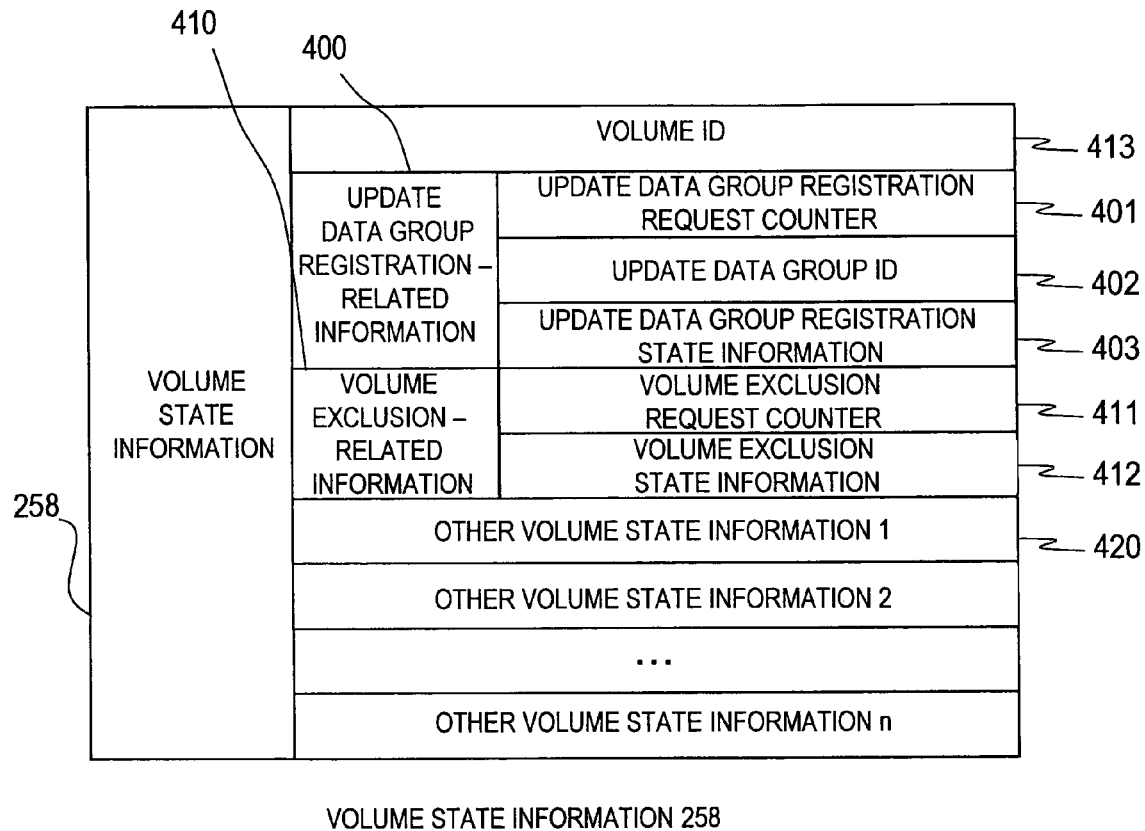
FIG. 5 is an explanatory diagram of volume state information according to the first embodiment of this invention.

FIG. 5 is an explanatory diagram of the volume state information 258.

The volume state information 258 contains information indicating the configuration of a logical volume, and is managed by the volume state management unit 252 for each logical volume.

The volume state information 258 contains a volume ID 413, update data group registration-related information 400, volume exclusion-related information 410 and other volume state information 420.

The volume ID 413 indicates the identifier of a logical volume.

The update data group registration-related information 400 contains an update data group registration request counter 401, an update data group ID 402 and update data group registration state information 403.

The update data group registration request counter 401 indicates the count of update data group registration requests/registration cancellation requests made to the data access control unit 202. The update data group ID 402 indicates an update data group ID obtained by the update data group control unit 255 as an update data group ID associated with the volume. The update data group registration state information 403 is information informing the input/output execution control unit 251 whether to attach an update data group ID.

The update data group control unit 255 instructs the input/output execution control unit 251 to attach an update data group ID by setting the update data group registration state information 403 to "registering". When there is no need to attach an update data group ID, the update data group control unit 255 sets the update data group registration state information 403 to "canceling registration".

The volume exclusion-related information 410 contains a volume exclusion request counter 411 and volume exclusion state information 412.

The volume exclusion request counter 411 indicates the count of volume exclusion requests/exclusion cancellation requests made by the exclusion request unit 203 to the exclusion control unit 254. The volume exclusion state information 412 indicates the state of volume exclusion.

When the logical volume identified by the volume ID 413 is not currently excluded and there is no request to exclude this logical volume, the exclusion control unit 254 sets the volume exclusion state information 412 to "exclusion cancelled". When the logical volume identified by the volume ID 413 is not currently excluded but there is a request to exclude this logical volume, in other words, in volume exclusion processing, the exclusion control unit 254 sets the volume exclusion state information 412 to "requesting exclusion". When the logical volume identified by the volume ID 413 is currently excluded but there is a request to cancel exclusion of this logical volume, in other words, in volume exclusion cancellation processing, the exclusion control unit 254 sets the volume exclusion state information 412 to "requesting exclusion cancellation".

The other volume state information 420 contains various kinds of information for managing the state of the volume. For instance, the free capacity of the volume and volume failure information are stored as the other volume state information 420.

Figure 6:
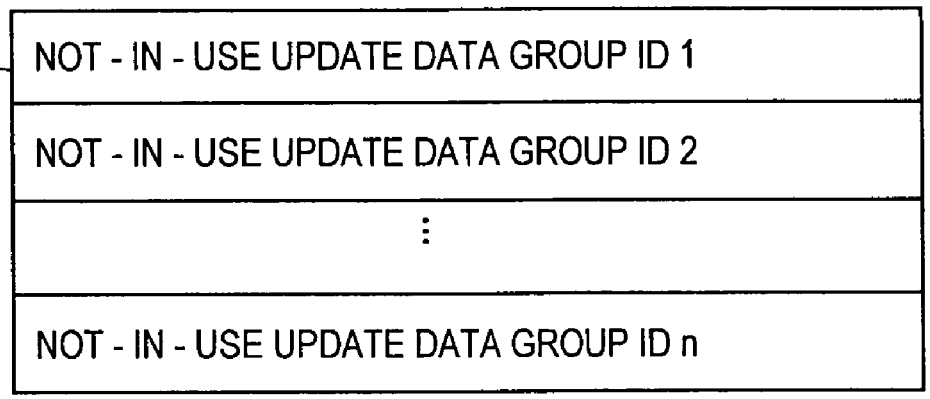
FIG. 6 is an explanatory diagram of an update data group ID table according to the first embodiment of this invention.

FIG. 6 is an explanatory diagram of the update data group ID table 259.

The update data group ID table 259 is used by the update data group management unit 253 to manage update data group IDs that are not in use.

When an update data group registration instruction necessitates registration of an update data group ID in the volume state information 258, the update data group management unit 253 obtains an update data group ID 259 that is not in use from the update data group ID table 259. The obtained update data group ID is deleted from the update data group ID table 259. When there is an update data group ID that is made unnecessary by an update data group registration cancellation instruction, the update data group management unit 253 returns the update data group ID to the update data group ID table 259. The returned update data group ID is now a not-in-use update data group ID.

Update data group IDs can be managed by various methods including one in which free IDs are managed in the form of list and one which employs, as an ID, information unique to each volume, for example, a serial number assigned to a volume or the address of the volume state information 258. An update data group, namely, the unit of update, is not limited to an update input/output request made for a single folder or file. A plurality of folders or main frames, a generally called data set, or a plurality of files or main frames, a generally called member, may make a unit of update and be assigned an update data group ID to be managed.

Figure 7:
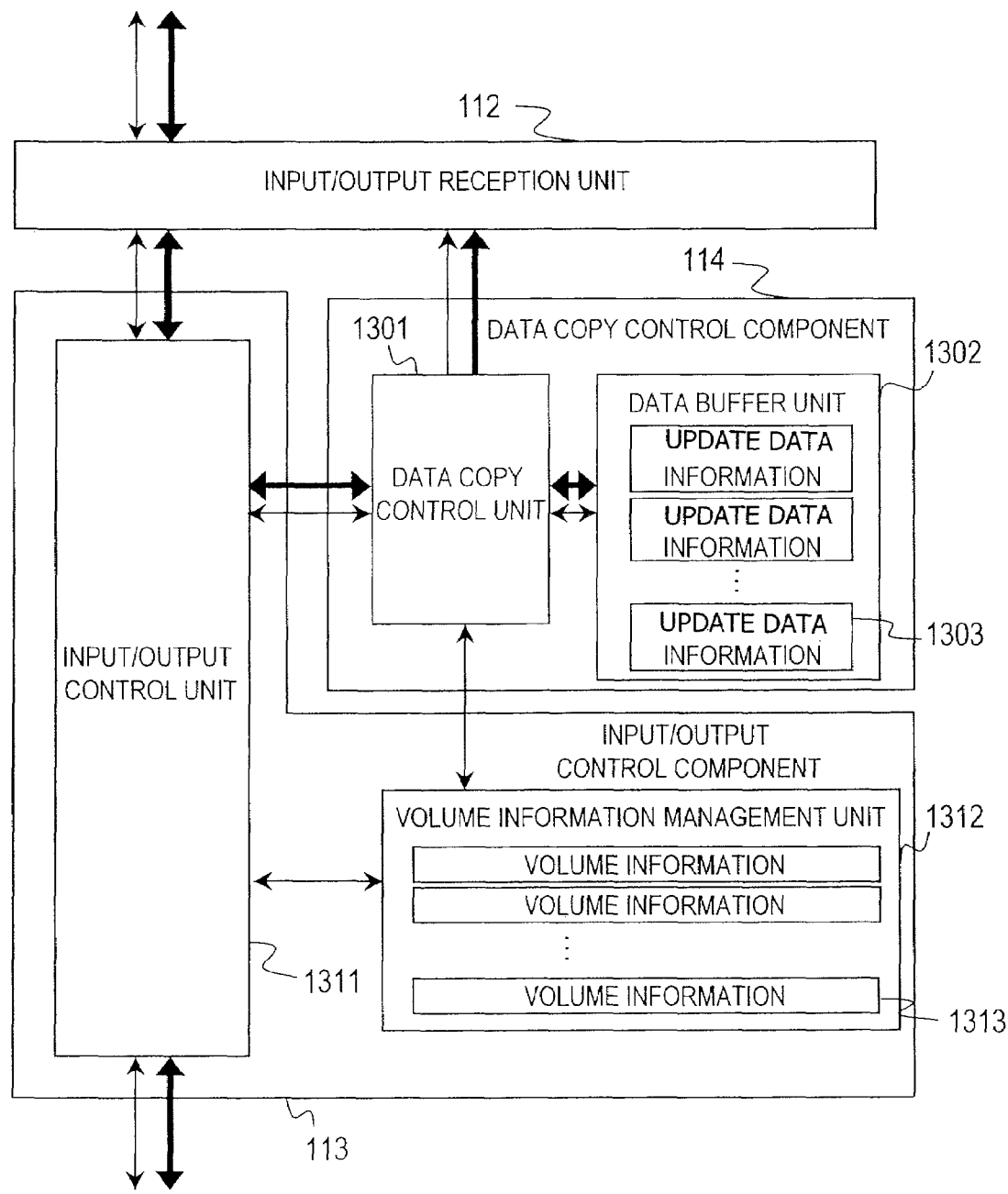
FIG. 7 is an explanatory diagram of an input/output reception unit, input/output control component, and data copy control component according to the first embodiment of this invention.

FIG. 7 is an explanatory diagram of the input/output reception unit 112, input/output control component 113 and data copy control component 114 of the disk controller 20.

The input/output control component 113 contains an input/output control unit 1311 and a volume information management unit 1312.

The data copy control component 114 contains a data copy control unit 1301 and a data buffer unit 1302.

The data buffer unit 1302 is placed in the disk controller 20B on the remote site 2 to convert a data update request to which an update data group ID is attached into update data information 1303 and to accumulate the update data information 1303 for remote copy.

The volume information management unit 1312 manages volume information 1313, which is information of a volume managed by the disk controller 20.

The data copy control unit 1301 controls remote copy between the disk controllers 20A and 20B. Specifically, the data copy control unit 1301 of the disk controller 20A on the main site 1 sends a data update request and a command for an update data group cancellation instruction to the disk controller 20B on the remote site 2. The data copy control unit 1301 of the disk controller 20B on the remote site 2 accumulates the update data information 1303 in the data buffer unit 1302, and makes the information in the data buffer unit 1302 reflected on the secondary volume 181 as dictated by a command for an update data group cancellation instruction.

The input/output control unit 1311 executes a command received via the input/output reception unit 112. The input/output control unit 1311 of the disk controller 20A on the main site 1 sends a data update request and a command for an update data group cancellation instruction to the data copy control unit 1301. The input/output control unit 1311 of the disk controller 20B on the remote site 2 sends, to the data copy control unit 1301, a data update request and a command for an update data group cancellation instruction that are received from the input/output reception unit 112, and executes a data update request received from the data copy control unit 1301 to update the secondary volume 181.

The input/output control unit 1311 also executes an exclusion command to set the volume information 1313 to "excluded", and executes an exclusion cancellation command to set the volume information 1313 to "exclusion cancelled".

Figure 8:
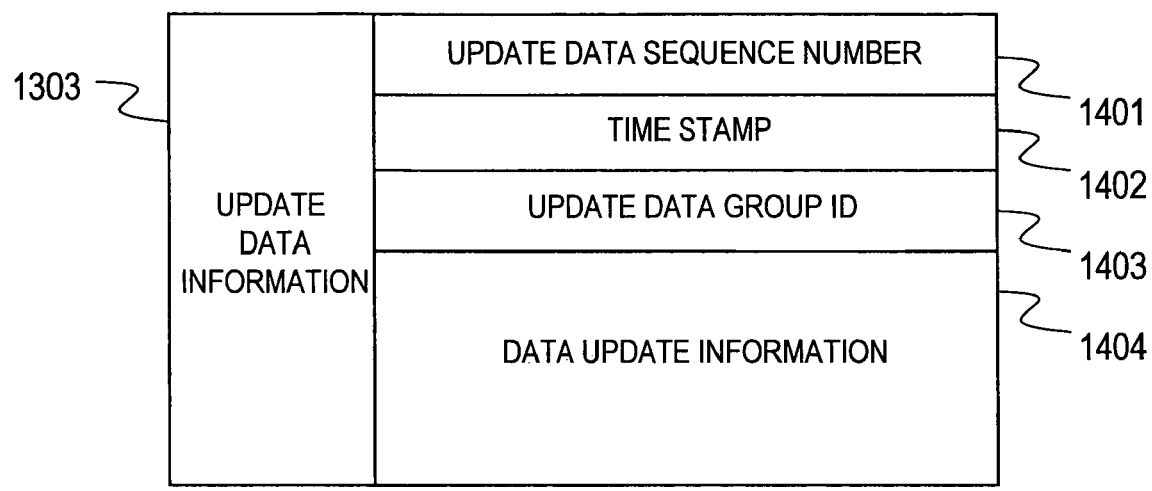
FIG. 8 is an explanatory diagram of update data information according to the first embodiment of this invention.

FIG. 8 is an explanatory diagram of the update data information 1303.

In the disk controller 20B on the remote site 2, the data copy control unit 1301 of the data copy control component 114 stores, as the update data information 1303, a received data update request to which an update data group ID is attached.

The update data information 1303 contains an update data sequence number 1401, a time stamp 1402, an update data group ID 1403 and data update information 1404.

The update data sequence number 1401 indicates a serial number assigned by the main site disk controller to ensure that data is updated in the correct order on the remote site. The time stamp 1402 is information reflecting a time (time stamp) attached to an input/output command group by the host computer 10. The time stamp 1402 may be used as the update data sequence number 1401. The update data group ID 1403 is information indicating to which update data group the update data information 1303 belongs. The data update information 1404 is information containing data to be updated and specifics of the update.

Figure 9:
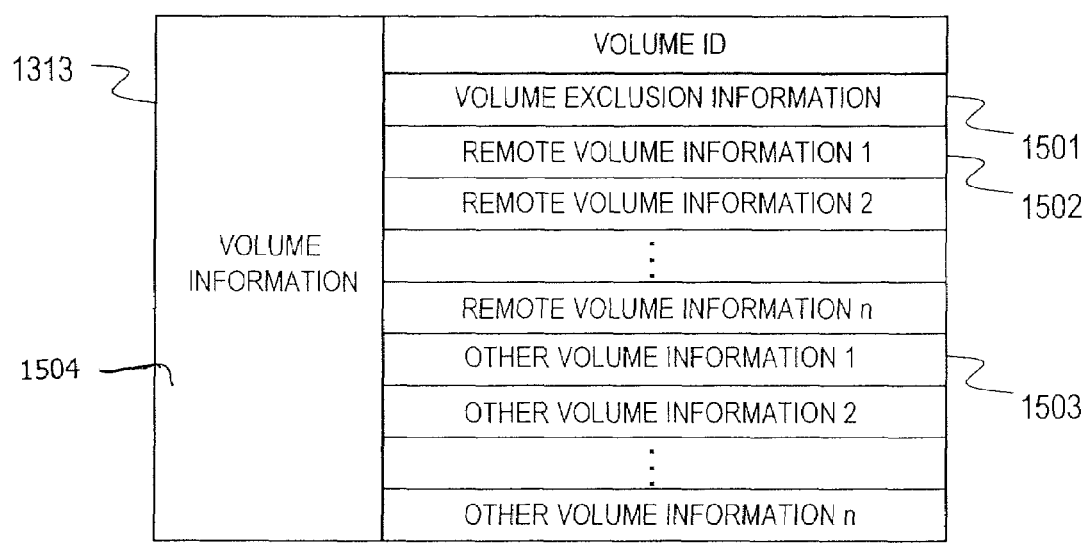
FIG. 9 is an explanatory diagram of volume information according to the first embodiment of this invention.

FIG. 9 is an explanatory diagram of the volume information 1313.

The volume information 1313 is managed by the input/output control unit 1311 of the input/output control component 113, and contains information of each logical volume set in the disk unit 30 of the disk controller 20.

The volume information 1313 contains a volume ID 1504, volume exclusion information 1501, remote volume information 1502 and other volume information 1503.

The volume ID 1504 indicates the identifier of a logical volume in question. The volume exclusion information 1501 indicates whether the logical volume is excluded or not. The remote volume information 1502 is information of a secondary volume set on the remote site to be paired with a primary volume on the main site. The other volume information 1503 contains various kinds of information for managing the volume, for example, the free capacity of the volume and volume failure information.

Described next is processing of the thus structured computer system.

In the computer system configured as above, the host computer 10A on the main site 1 requests the disk controller 20A to input/output data stored in the primary volume 121 of the disk unit 30A. When the input/output request is a data update request, the disk controller. 20A stores update data requested by the update request in the primary volume 121 and, at the same time, requests the disk controller 20B on the remote site 2 to store this data in the secondary volume 181. Processing as this for storing data of the main site 1 in the remote site 2 is called remote copy.

In the case where a disaster or the like interrupts remote copy between the main site 1 and the remote site 2 for data update, data update is hindered for a part of data group (a file, for example) that is valid to the host computer 10A and it results in data destruction or volume destruction. This invention prevents such situation by setting a data group that is valid to the host computer 10A as an update data group, and executing processing of making the data group reflected on the secondary volume 181 with all data pieces that belong to the update data group as one unit. Specifics of this processing will be given in the following description.

Figure 10:
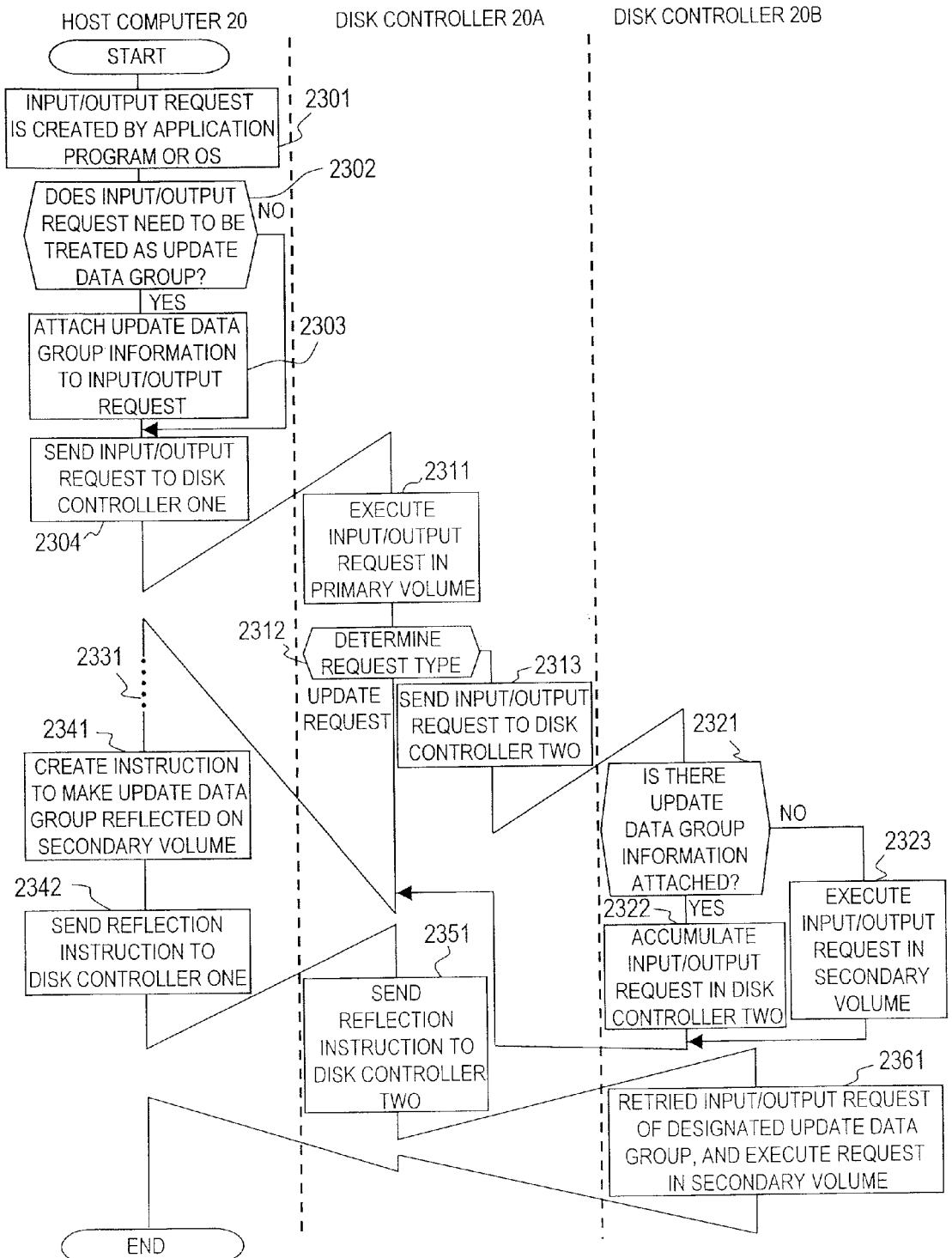
FIG. 10 is a flow chart outlining processing of the computer system according to the first embodiment of this invention.

FIG. 10 is a flow chart outlining processing of the computer system.

The application program 101 or the OS 102, which is run on the host computer 10, creates an input/output request in the host computer 10 (Step 2301).

Upon creation of the input/output request, the OS 102 judges whether to treat a plurality of update input/output requests as one update data group (Step 2302). When it is necessary to handle a plurality of update input/output requests as one update data group, the OS 102 attaches information for identifying an update data group to the input/output request (Step 2303). The OS 102 then sends the input/output request to the disk controller 20A through the port 105 (Step 2304).

When it is not necessary to handle input/output requests as an update data group, the OS 102 sends the created input/output request to the disk controller 20A via the port 105 without attaching information for identifying an update data group to the input/output request (Step 2304).

In the disk controller 20A, the input/output reception unit 112 receives the input/output request via the port 111. This input/output request is executed by the input/output control unit 1311 to input/output data in the primary volume 121 (Step 2311).

The input/output control unit 1311 judges the type of the input/output request (Step 2312). When the received input/output request is an update request, the input/output control unit 1311 sends the update request via the input/output reception unit 112, the port 115 and the network 150 to the disk controller 20B on the remote site 2 (Step 2313).

In the disk controller 20B, the input/output reception unit 112 receives the update request via the port 115. The input/output control unit 1311 judges whether or not update data group information is attached to the update request sent from the main site 1 (Step 2321). When the information is attached, the update request is stored in the data buffer unit 1302 to accumulate, update requests that have update data group information attached (Step 2322). When no update data group information is attached to the update request, the input/output control component 113 executes the update request to input/output data in the secondary volume 181 (Step 2323). In short, normal remote copy is performed when information for identifying an update data group is not attached to an input/output request. After execution of input/output is finished for every data in an update data group, the host computer 10 is notified of the completion (Step 2331).

Next, the host computer 10A creates an instruction to make update requests that belong to the same update data group and have been accumulated in the disk controller 20B on the remote site 2 reflected on the secondary volume 181 (Step 2341). The created instruction is sent to the disk controller 20A (Step 2342).

The disk controller 20A sends the instruction to make the update data group reflected to the disk controller 20B (Step 2351).

Receiving the reflection instruction, the disk controller 20B searches update information accumulated in the data buffer unit 1302 for update requests of the update data group designated by the reflection instruction. The retrieved update requests are executed to input/output data in the secondary volume 181 (Step 2361).

Through the above processing, an input/output request made by the host computer 10A is executed via the disk controller 20A to input/output data in the primary volume 121 of the disk unit 30A. This input/output request is also executed via the disk controller 20B on the remote site 2 to input/output data in the secondary volume 181 of the disk unit 30B. During the processing, update data pieces are accumulated in the data buffer unit 1302 of the disk controller 20B, and are inputted/outputted to/from the secondary volume 181 at once when a reflection instruction is issued from the host computer 10A.

When a disaster strikes this computer system, service that has been executed with the host computer 10A, the disk controller 20A and the disk unit 30A on the main site 1 is handed over to the remote site 2, and the host computer 10B, the disk controller 20B and the disk unit 30B resume the service.

Figure 11:
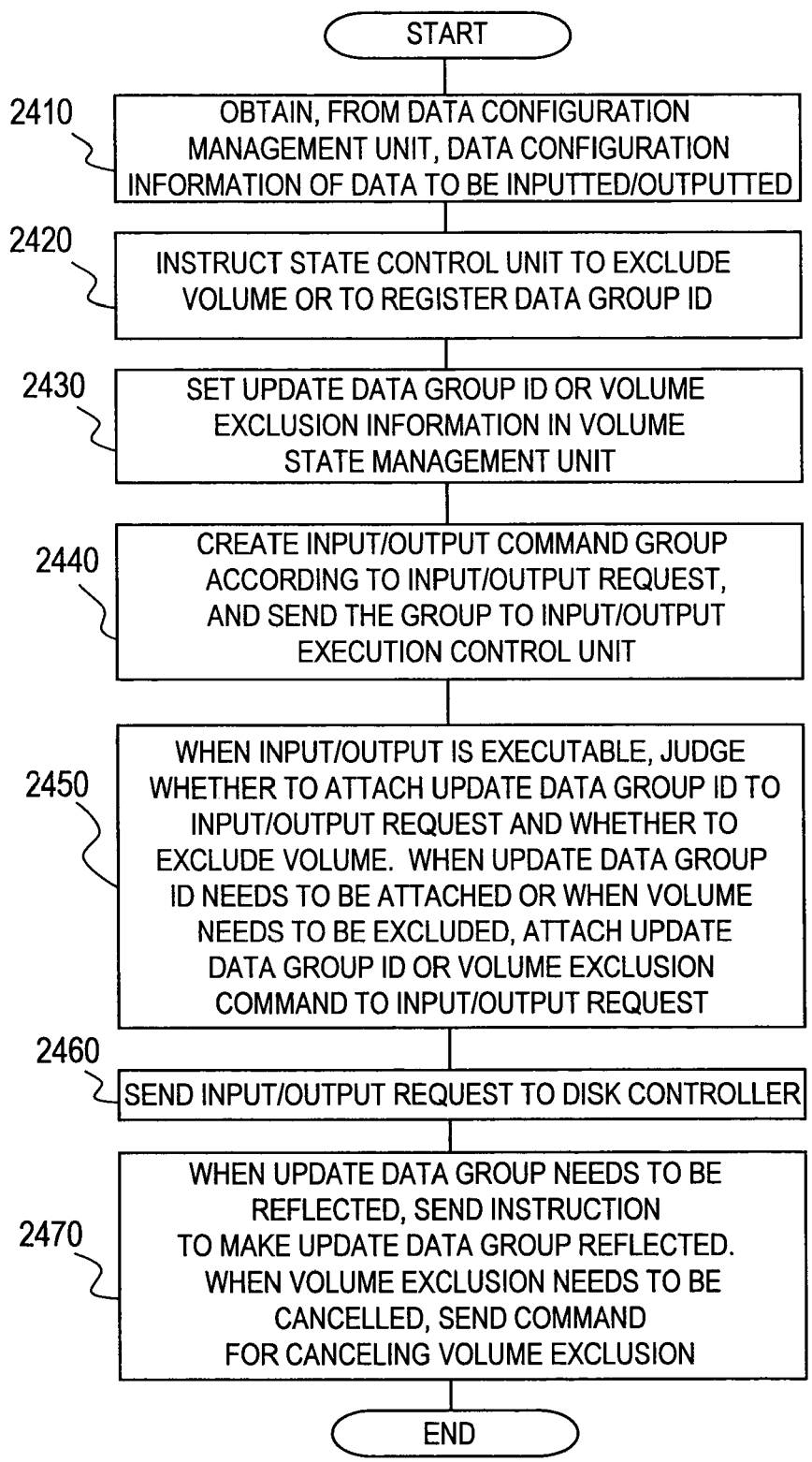
FIG. 11 is a flow chart for processing of a host computer according to the first embodiment of this invention.

FIG. 11 is a flow chart for processing of the host computer 10.

The flow chart of FIG. 11 outlines processing executed by the input/output data management program 103 and the input/output execution management program 104, which are provided in the OS 102 of the host computer 10.

The data access control unit 202 of the input/output management program 103 receives an input/output request from the OS 102 or the application program 101, analyzes the input/output request, and obtains from the data configuration management unit 201 the data configuration information 206 of data that is requested to be inputted/outputted (Step 2410).

The data access control unit 202 next judges, from the result of analyzing the input/output request and the obtained data configuration information 206, whether to exclude a volume and whether to register an update data group. When they are judged as necessary, the request unit 205 instructs the state control unit 257 to exclude a volume and to register an update data group ID (Step 2420).

Instructed by the request unit 205, the state control unit 257 sets an update data group ID and volume exclusion information in the volume state management unit 252 (Step 2430). The data access control unit 202 next creates an input/output command group according to the received input/output request, and sends the input/output command group to the input/output execution control unit 251 (Step 2440).

Receiving the input/output request from the data access control unit 202, the input/output execution control unit 251 first has the state control unit 257 judge whether the input/output request is executable or not. When the input/output request is judged as executable, the input/output execution control unit 251 judges, from information set in the volume state management unit 252, whether to attach an update data group ID. When it is judged that the input/output request needs an update data group ID, an update data group ID is attached to the input/output request (Step 2450). Then the input/output execution control unit 251 sends the input/output request to the disk controller 20A (Step 2460).

The host computer 10 uses the disk controller 20A to process input/output of data in a logical volume through the processing of Steps 2410 to 2460. Whether to attach an update data group ID is judged before every one of a series of update input/output requests (update data group) is finished being processed or while a logical volume designated by an input/output request is excluded.

In the case where every input/output request belonging to an update data group is sent to the disk controller 20A, the data access control unit 202 has the request unit 205 instruct the state control unit 257 to cancel the update data group. Receiving the update data group cancellation instruction, the state control unit 257 creates a command for cancellation instruction and instructs the input/output execution control unit 2251 to execute the command for cancellation instruction. The input/output execution control unit 251 sends the command for cancellation instruction to the disk controller 20A (Step 2470).

Figure 12:
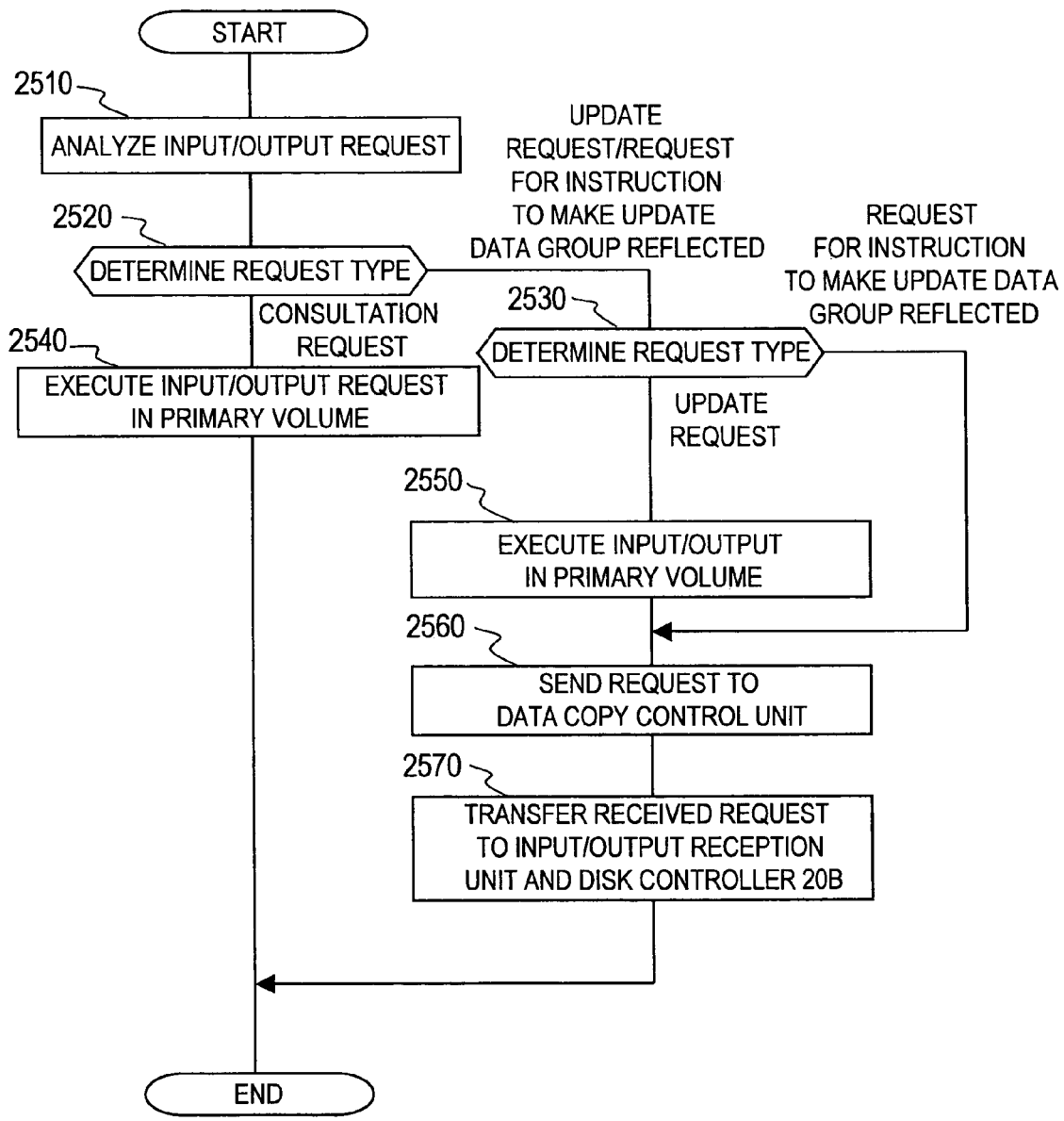
FIG. 12 is a flow chart for processing of a main site disk controller according to the first embodiment of this invention.

FIG. 12 is a flow chart for processing of the disk controller 20A on the main site 1.

Processing of this flow chart is executed by the input/output control component 113 and the data copy control component 114 in the disk controller 20A when an input/output request is received via the input/output reception unit 112 from the host computer 10A.

In the disk controller 20A, the input/output control unit 1311 of the input/output component 113 analyzes an input/output request received via the port 111 and the input/output reception unit 112 (Step 2510). Through the analysis, the type of the input/output request is determined (Step 2520).

When the input/output request is determined as a consultation input/output request, the input/output control unit 1311 reads data out of the primary volume 121 and sends the read data via the input/output reception unit 112 and the port 111 to the host computer 10A, which has made the request (Step 2540).

When it is determined that the input/output request is not a consultation input/output request, the input/output control unit 1311 judges whether the input/output request is an update request or an update data group reflection instruction request (Step 2530).

When the input/output request is determined as an update input/output request, the input/output control unit 1311 writes data in the primary volume 121 (Step 2550). Then the input/output request is sent to the data copy control unit 1301 (Step 2560). The data copy control unit 1301 sends the received update input/output request via the input/output reception unit 112 and the port 115 to the disk controller 20B (Step 2570).

When the input/output request is determined as an update data group reflection instruction request, the input/output control unit 1311 sends the input/output request to the data copy control unit 1301 without executing the processing of Step 2550 (Step 2560). The data copy control unit 1301 sends the received update data group reflection instruction request via the input/output reception unit 112 and the port 115 to the disk controller 20B (Step 2570).

Through the above processing, an input/output request sent from the host computer 10A is processed.

Figure 13:
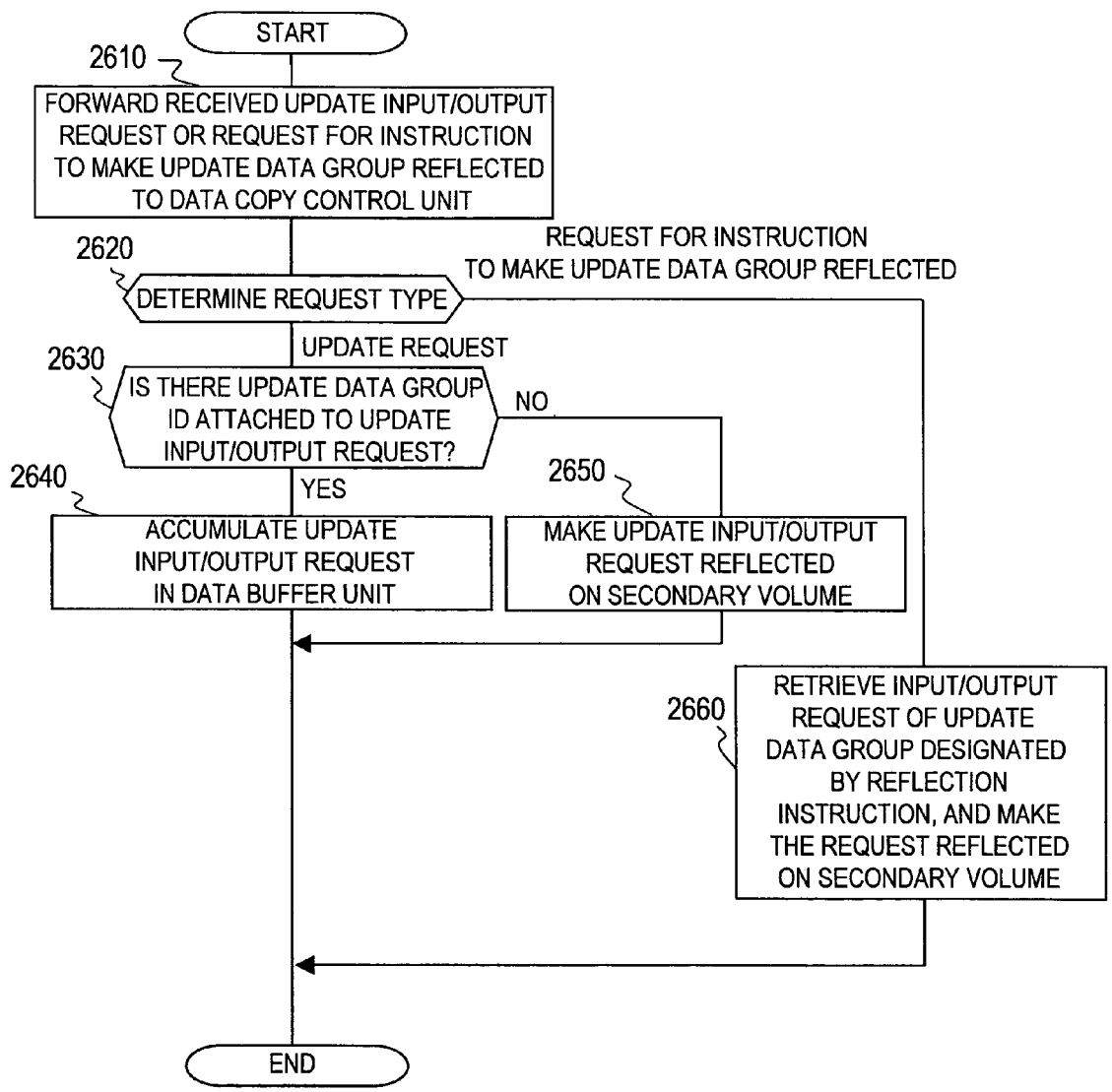
FIG. 13 is a flow chart for processing of a remote site disk controller according to the first embodiment of this invention.

FIG. 13 is a flow chart for processing of the disk controller 20B on the remote site 2.

Processing of this flow chart is executed by the input/output control component 113 and the data copy control component 114 in the disk controller 20B when an input/output request is received via the input/output reception unit 112 from the disk controller 20A.

The input/output control unit 1311 sends an update input/output request or an update data group reflection instruction, which is received via the port 115 and the input/output reception unit 112B, to the data copy control unit 1301 (Step 2610). The data copy control unit 1301 judges whether the received request is an update input/output request or not (Step 2620). When the received request is an update input/output request, the data copy control unit 1301 judges whether or not an update data group ID is attached to the request (Step 2630). When ID information is attached, the update input/output request is stored in the data buffer unit 1302 to accumulate update requests that have update data group information attached (Step 2640). When ID information is not attached, the update input/output request is sent to the input/output control unit 1311 to be reflected on the secondary volume 181 (Step 2650). When the received request is not an update input/output request (when the received request is an update data group reflection instruction), the data buffer unit 1302 is searched for update input/output requests of an update data group instructed to be reflected. The retrieved requests (update input/output requests of an update data group instructed to be reflected) are sent to the input/output control unit 1311 to be reflected on the secondary volume 181 (Step 2660).

Figure 14:
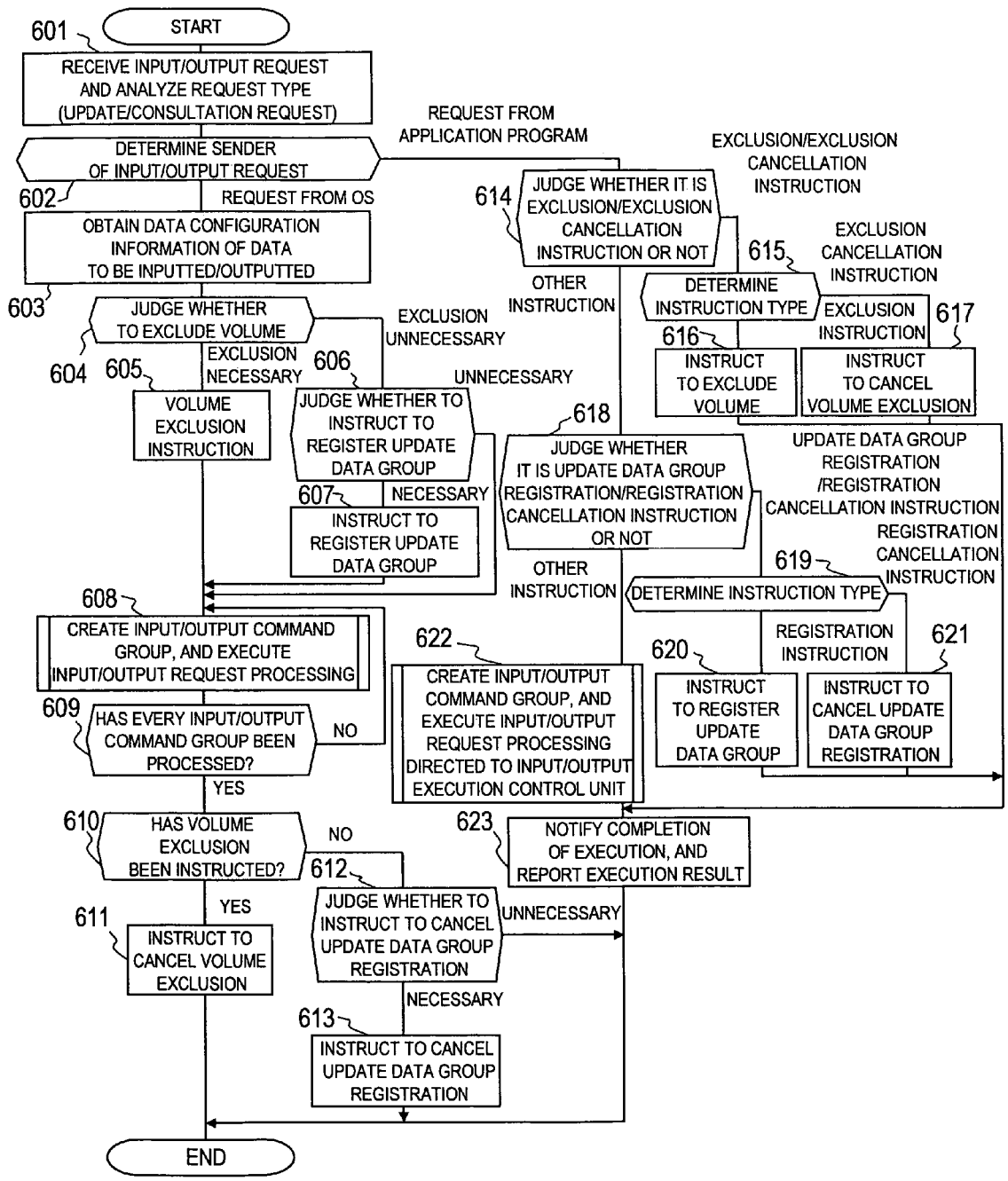
FIG. 14 is a flow chart for processing of a data access control unit according to the first embodiment of this invention.

FIG. 14 is a flow chart showing the flow of control exerted by the data access control unit 202.

The data access control unit 202 receives an input/output request and analyzes the request. Specifically, the data access control unit 202 analyzes a received input/output request to find out whether the request is an input/output request from the OS 102, an input/output request from the application program 101, an update request, a consultation request, a volume exclusion request, or an update data group registration/registration cancellation instruction (Step 601).

From the result of the analysis, whether the received request is an input/output request from the OS 102 or an input/output request from the application program 101 is judged first (Step 602).

In the case of an input/output request received from the OS 102, the data access control unit 202 obtains from the data configuration management unit 201 the data configuration information 206 of data requested to be inputted/outputted (Step 603). From the analysis result of Step 601 and the obtained data configuration information 206, whether to exclude a volume is judged (Step 604).

Judging that volume exclusion is necessary, the data access control unit 202 instructs the exclusion request unit 203 to exclude a volume (Step 605). The processing then moves to Step 608.

When volume exclusion is judged as unnecessary, whether to instruct to register an update data group is judged from the analysis result of Step 601 and the obtained data configuration information 206 (Step 606). When update data group registration is necessary, the data access control unit 202 instructs the update data group request unit 204 to register an update data group (Step 607).

In Step 608, an input/output command group is created and input/output request processing directed to the input/output execution control unit 251 is executed. Details of this processing will be described with reference to FIG. 15.

The data access control unit 202 repeats the input/output request processing until every command in the input/output command group to process the input/output request is executed (Step 609).

After every command in the input/output command group is executed, the data access control unit 202 judges whether volume exclusion has been instructed in Step 604 or not (Step 610). In the case where a volume exclusion instruction has been issued, the data access control unit 202 instructs the exclusion request unit 203 to cancel the volume exclusion (Step 611). In the case where a volume exclusion instruction has not been issued, the data access control unit 202 judges whether to instruct to cancel update data group registration (Step 612). When an update data group registration cancellation instruction is necessary, the data access control unit 202 instructs the update data group request unit 204 to cancel update data group registration (Step 613).

When it is judged in Step 602 that the received request is not an input/output request from the OS 102, in other words, when the received request is an input/output request from the application program 101, the data access control unit 202 judges whether or not the received request is a volume exclusion/exclusion cancellation instruction (Step 614). When the received input/output request is not a volume exclusion/exclusion cancellation instruction, the data access control unit 202 judges whether or not the received input/output request is an update data group registration/registration cancellation instruction (Step 618).

When the received input/output request is not an update data group registration/registration cancellation instruction, the data access control unit 202 creates an input/output command group according to the input/output request, and executes input/output request processing directed to the input/output execution control unit 251 (Step 622). Details of the processing in Step 622 will be described with reference to FIG. 15.

When it is judged in Step 614 that the received request is an exclusion/exclusion cancellation instruction, the data access control unit 202 determines the instruction type of the received request (Step 615). In the case where the received request is a volume exclusion instruction, the data access control unit 202 instructs the exclusion request unit to exclude a volume (Step 616). In the case where the received request is a volume exclusion cancellation instruction, the data access control unit 202 instructs the exclusion request unit to cancel volume exclusion (Step 617).

When it is judged in Step 618 that the received request is an update data group registration/registration cancellation instruction, the data access control unit 202 determines the instruction type of the received request (Step 619). In the case where the received request is an update data group registration instruction, the data access control unit 202 instructs the update data group request unit 204 to register an update data group (Step 620). In the case where the received request is an update data group registration cancellation instruction, the data access control unit 202 instructs the update data group request unit 204 to cancel update data group registration (Step 621).

Lastly, the data access control unit 202 notifies the application program 101, which has made the input/output request, of completion of execution of the request and reports the result of execution of the request to the application program 101 (Step 623).

Figure 15:
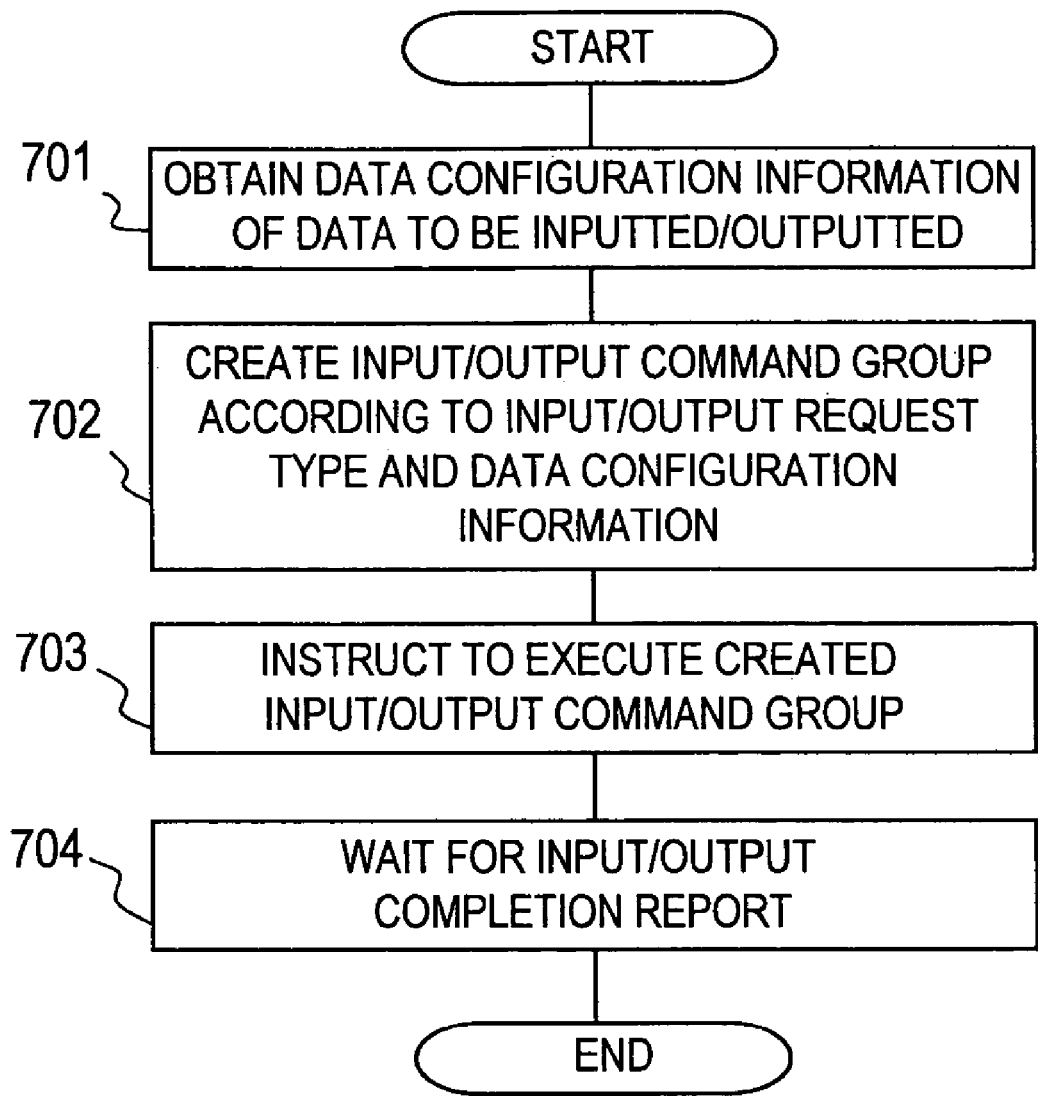
FIG. 15 is a flow chart for creation of an input/output command group in the data access control unit and input/output request processing directed to an input/output execution control unit according to the first embodiment of this invention.

FIG. 15 is a flow chart for creation of an input/output command group and input/output request processing directed to the input/output execution control unit 251 which are performed by the data access control unit 202.

The data access control unit 202 obtains from the data configuration management unit 201 the data configuration information 206 of data requested to be inputted/outputted (Step 701), and creates an input/output command group according to the result of analysis performed on an input/output request in Step 601 and the obtained data configuration information 206 (Step 702).

Then the data access control unit 202 instructs the input/output execution control unit 251 to execute the created input/output command group (Step 703), and waits for an input/output completion report from the input/output execution control unit 251 (Step 704).

Figure 16A:
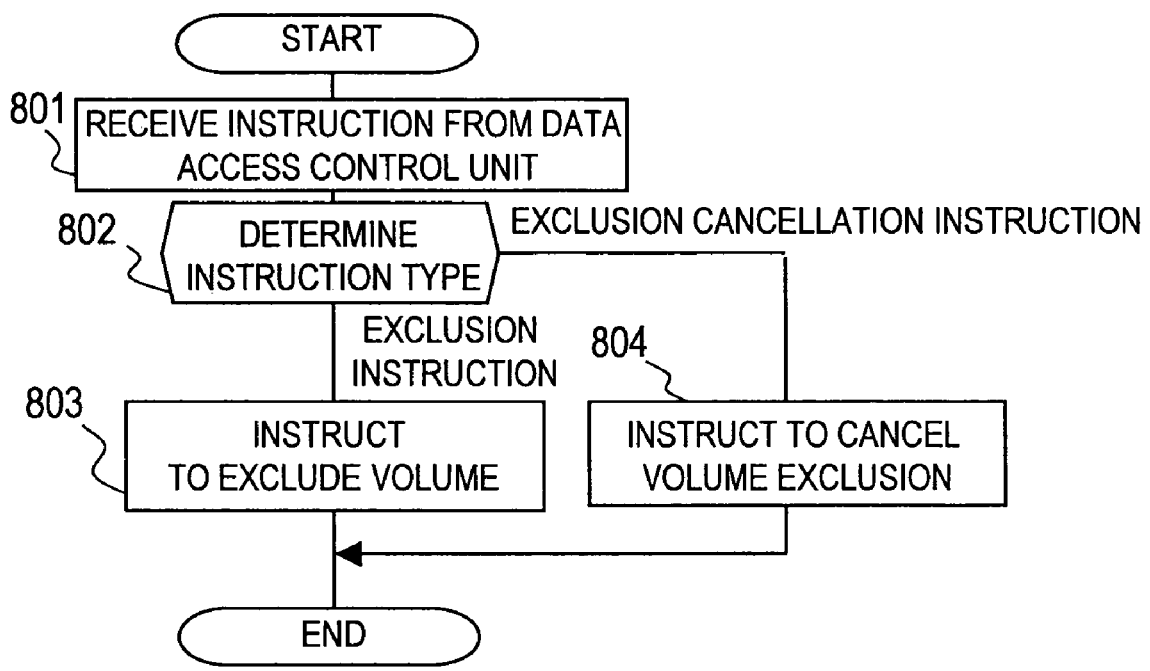
FIG. 16A is a flow chart for processing of an exclusion request unit according to the first embodiment of this invention.

FIG. 16A is a flow chart for processing of the exclusion request unit 203 of the request unit 205.

The exclusion request unit 203 receives an instruction from the data access control unit 202 (Step 801), and judges whether the received instruction is an exclusion instruction or an exclusion cancellation instruction (Step 802). When the received instruction is an exclusion instruction, the exclusion request unit 203 instructs the exclusion control unit 254 to exclude a volume (Step 803). When the received instruction is an exclusion cancellation instruction, the exclusion request unit 203 instructs the exclusion control unit 254 to cancel volume exclusion (Step 804).

Figure 16B:
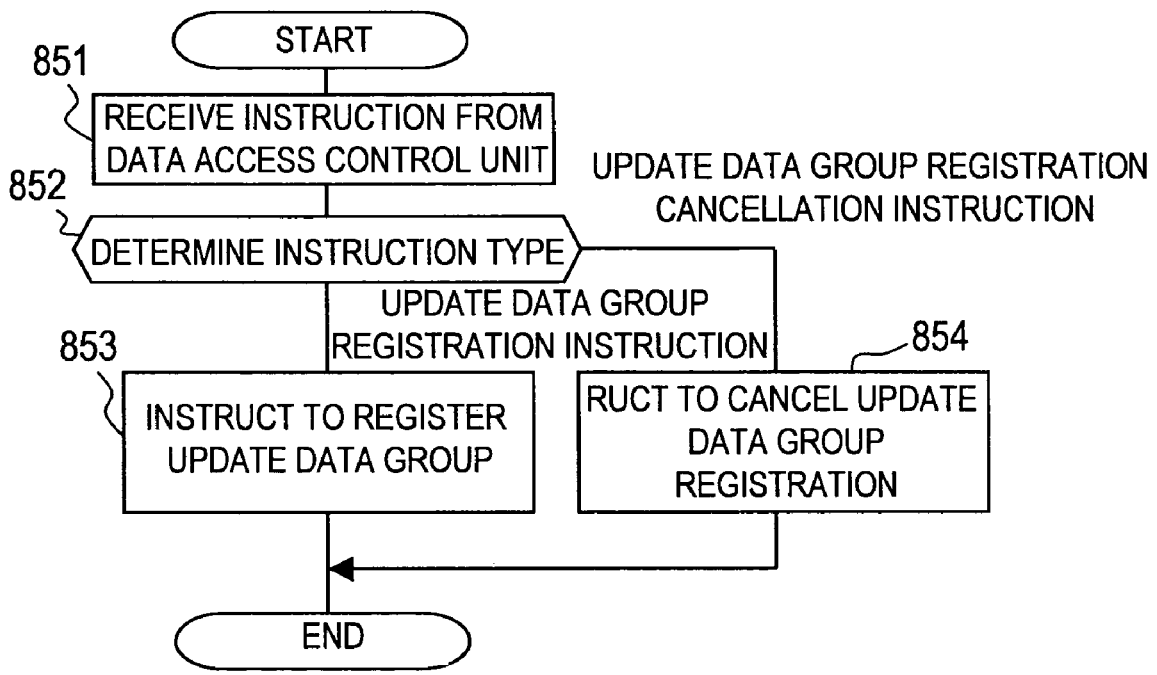
FIG. 16B is a flow chart for processing of an update data group request unit according to the first embodiment of this invention.

FIG. 16B is a flow chart for processing of the update data group request unit 204 of the request unit 205.

The update data group request unit 204 receives an instruction from the data access control unit 202 (Step 851), and judges whether the received instruction is an update data group registration instruction or an update data group registration cancellations instruction (Step 852).

When the received instruction is an update data group registration instruction, the update data group request unit 204 instructs the update data group control unit 255 to register an update data group (Step 853).

When the received instruction is an update data group registration cancellation instruction, the update data group request unit 204 instructs the update data group control unit 255 to cancel update data group registration (Step 854).

Figure 17:
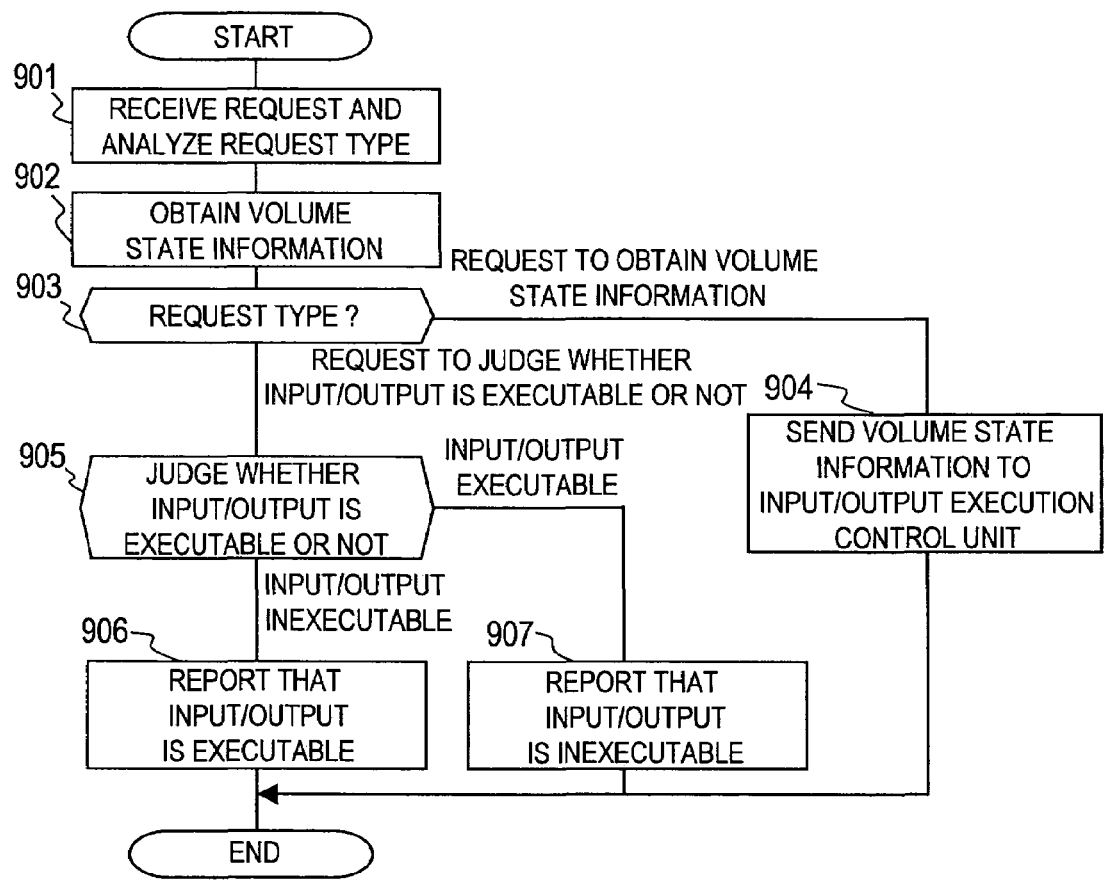
FIG. 17 is a flow chart for processing of a volume state control unit according to the first embodiment of this invention.

FIG. 17 is a flow chart for processing of the volume state control unit 256.

The volume state control unit 256 receives a request from the input/output execution control unit 251 and analyzes the type of the request (Step 901). The volume state control unit 256 then obtains from the volume state management unit 252 the volume state information 258 of a requested volume (Step 902).

The volume state control unit 256 next determines the type of the request (Step 903). When the received request is a request to obtain volume state information, the volume state control unit 256 sends the volume state information 258 obtained from the volume state management unit 252 to the input/output execution control unit 251 (Step 904). When the received request is a request to judge input/output executability, the volume state control unit 256 judges from the obtained volume state information 258 whether input/output is executable or not (Step 905). In the case where input/output is executable, the volume state control unit 256 reports the fact to the input/output execution control unit 251 (Step 906). In the case where input/output is inexecutable, for example, while another input/output request is being executed or when there is a failure in a volume, the volume state control unit 256 reports to the input/output execution control unit 251 that input/output is inexecutable.

Figure 18:
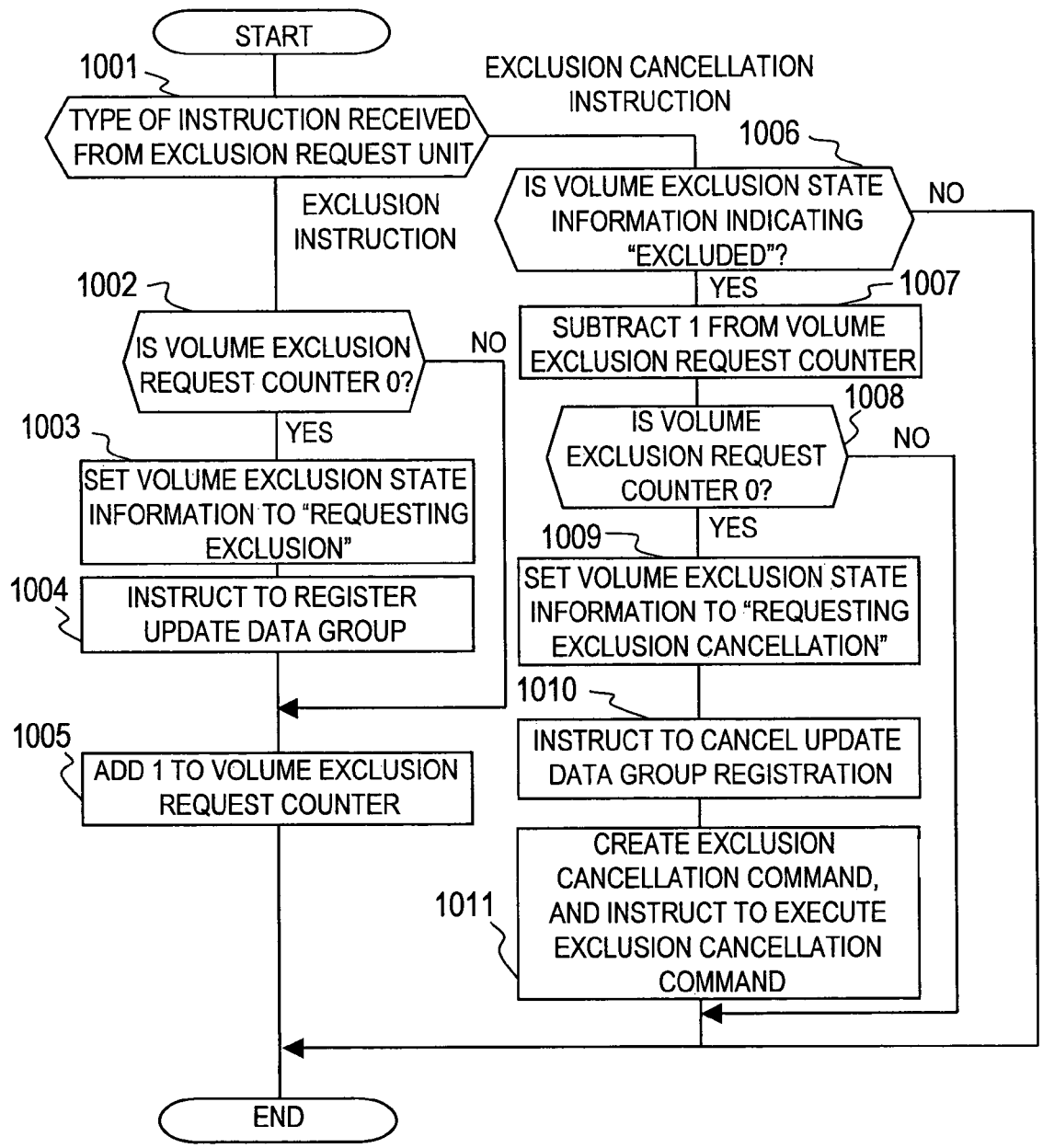
FIG. 18 is a flow chart for processing of an exclusion control unit according to the first embodiment of this invention.

FIG. 18 is a flow chart for processing of the exclusion control unit 254.

The exclusion control unit 254 receives a request from the exclusion request unit 203 and judges whether the received request is a volume exclusion instruction or not (Step 1001). In the case of a volume exclusion instruction, the exclusion control unit 254 judges whether the volume exclusion request counter 411 in the volume state information 258 reads 0 or not (Step 1002). When the volume exclusion request counter 411 is 0, the exclusion control unit 254 sets the volume exclusion state information 412 to "requesting exclusion", which means that volume exclusion processing is being executed (Step 1003). Then the exclusion control unit 254 instructs the update data group control unit to register an update data group (Step 1004).

The exclusion control unit 254 next adds 1 to the volume exclusion request counter 411 (Step 1005). In the case where the reading of the volume exclusion request counter 411 is larger than 0, the exclusion control unit 254 adds 1 to the volume exclusion request counter 411 without changing the volume exclusion state information 412 (Step 1005).

On the other hand, when the received request is not a volume exclusion instruction, in other words, when the received request is a volume exclusion cancellation instruction, the exclusion control unit 254 judges whether or not the volume exclusion state information 412 says "excluded" (Step 1006). When the volume exclusion state information 412 is set to "excluded", the exclusion control unit 254 subtracts 1 from the volume exclusion request counter 411 (Step 1007). Then the exclusion control unit 254 judges whether or not the reading of the volume exclusion request counter 411 after subtracting 1 is 0 (Step 1008).

When the volume exclusion request counter 411 is 0 in Step 1008, the exclusion control unit 254 sets the volume exclusion state information 412 to "requesting exclusion cancellation" (Step 1009). The exclusion control unit 254 then instructs the update data group control unit to cancel update data group registration (Step 1010). Thereafter, the exclusion control unit 254 creates an exclusion cancellation command and instructs the input/output execution control unit 251 to execute the exclusion cancellation command (Step 1011).

In the case where exclusion cancellation is requested when the volume exclusion state information 412 is not set to "excluded" in Step 1006, in other words, when the volume is not excluded in Step 1006, the exclusion control unit 254 turns down the request and terminates the processing.

Figure 19:
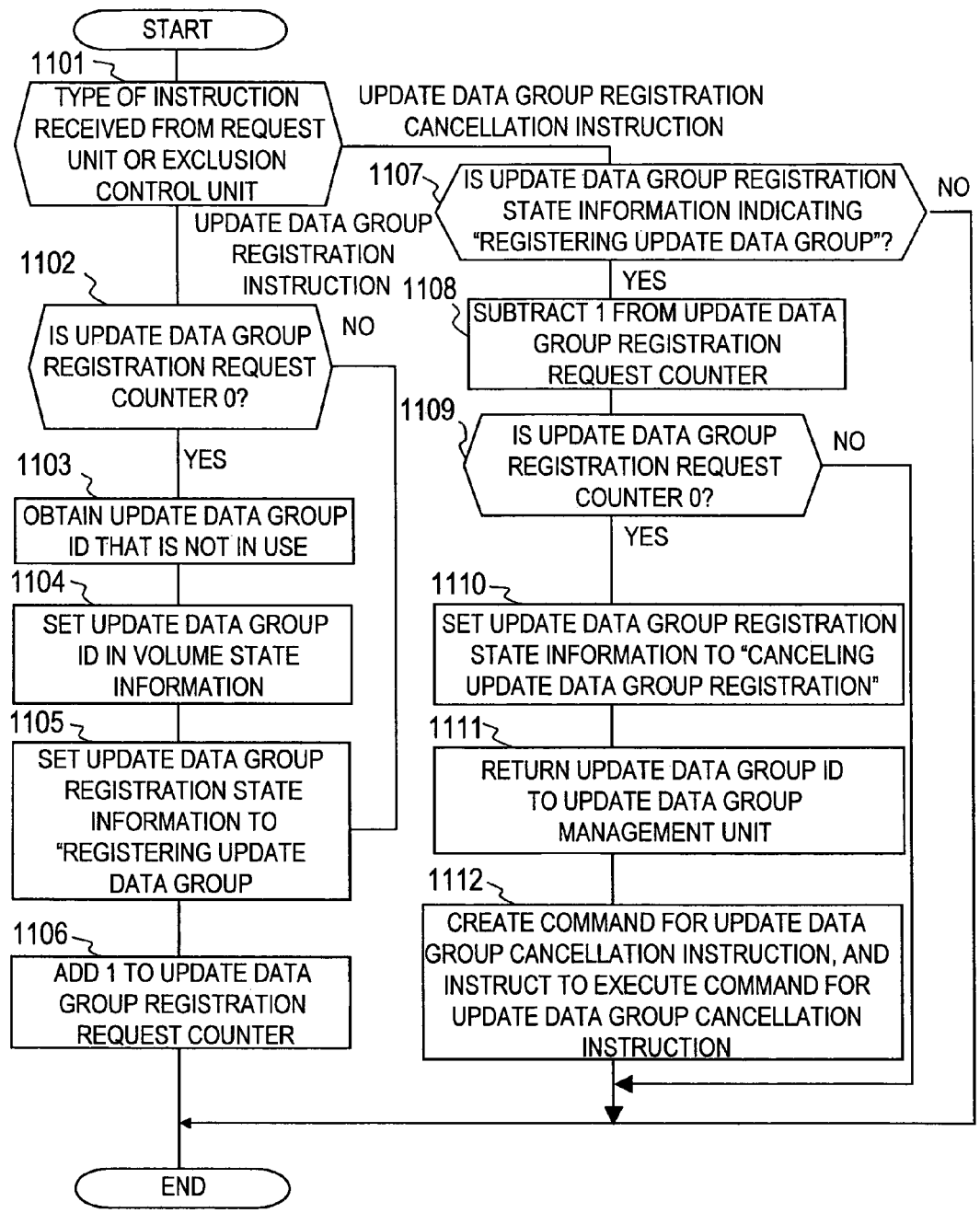
FIG. 19 is a flow chart for processing of an update data group control unit according to the first embodiment of this invention.

FIG. 19 is a flow chart for processing of the update data group control unit 255.

The update data group control unit 255 determines the type of an instruction received from the update data group request unit 204 or the exclusion control unit 254 (Step 1101).

When the received instruction is an update data group registration instruction, the update data group control unit 255 judges whether the update data group registration request counter 401 reads 0 or not (Step 1102). In the case where the reading of the update data group registration request counter 401 is 0, the update data group control unit 255 obtains from the update data group management unit 253 the update data group ID 259 that is not in use (Step 1103). The obtained update data group ID is set in the volume state information 258 (Step 1104). Then the update data group control unit 255 sets the update data group registration state information 403 to "registering an update data group" (Step 1105), and adds 1 to the update data group registration request counter 401 (Step 1106).

On the other hand, when it is found in Step 1102 that the reading of the update data group registration request counter 401 is larger than 0, the update data group control unit 255 adds 1 to the update data group registration request counter 401 (Step 1106).

In the case where the instruction received in Step 1101 is an update data group registration cancellation instruction, the update data group control unit 255 judges whether or not the update data group registration state information 403 in the volume state information 258 says "registering an update data group" (Step 1107). In the case where the update data group registration state information 403 is set to "registering an update data group", the update data group control unit 255 subtracts 1 from the update data group registration request counter 401 (Step 1108). The update data group control unit 255 then judges whether the reading of the update data group registration request counter 401 after subtracting 1 is 0 or not (Step 1109).

When the update data group registration request counter 401 reads 0 in Step 1109, the update data group control unit 255 sets the update data group registration state information 403 to "canceling update data group registration" (Step 1110). Thereafter, the update data group ID in the volume state information 258 is returned to the update data group management unit 253 (Step 1111).

The update data group control unit 255 next creates a command for an update data group cancellation instruction, and instructs the input/output execution control unit 251 to execute the command for an update data group cancellation instruction (Step 1112). In the case where a registration cancellation request is issued when the update data group registration state information 403 does not say "registering an update data group" in Step 1107, in other words, when an update data group is not registered in Step 1107, the update data group control unit 255 turns down the request and terminates the processing.

Figure 20:
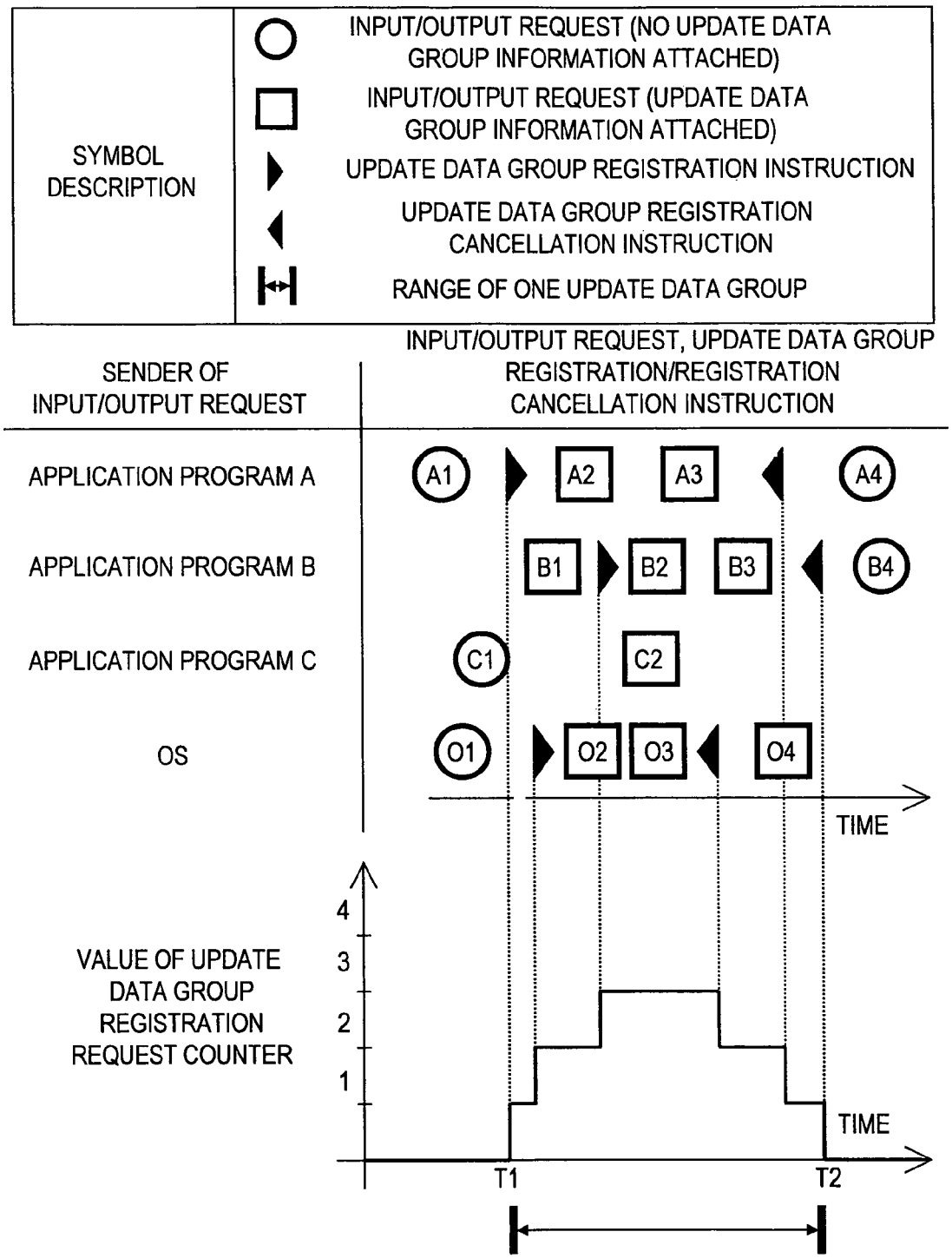
FIG. 20 is an explanatory diagram of a counter according to the first embodiment of this invention.

FIG. 20 is an explanatory diagram of the counters mentioned above.

The example of FIG. 20 shows when an input/output request and an update data group registration/registration cancellation instruction are issued from three application programs A, B, and C and from an OS.

The value of the update data group registration request counter is set according to at which point an update data group registration/registration cancellation instruction is issued. The counter value determines from which input/output request to which input/output request one update data group covers.

Input/output requests made since when the value of the update data group registration request counter is changed from 0 to 1 by an update data group registration instruction through the processing of FIG. 19 until when an update data group registration cancellation instruction changes the counter value from 1 to 0 are treated as one update data group. Specifically, input/output requests marked by square symbols in FIG. 20 are all treated as one update data group.

For instance, when the application program A makes an input/output request and an update data group registration request is made at a timing T1, 1 is added to the counter value. When another application program, B or C, subsequently makes an update data group registration request, 1 is added to the counter value each time the request is made. When another application program, B or C, subsequently makes an update data group registration cancellation request, 1 is subtracted from the counter value each time the request is made. Lastly, an update data group registration cancellation instruction issued at a timing T2 changes the counter value to 0. At this point, an instruction to make every data that belongs to the update data group reflected on the secondary volume 181 of the remote site 2 at once is sent to the disk controller 20B.

Figure 21:
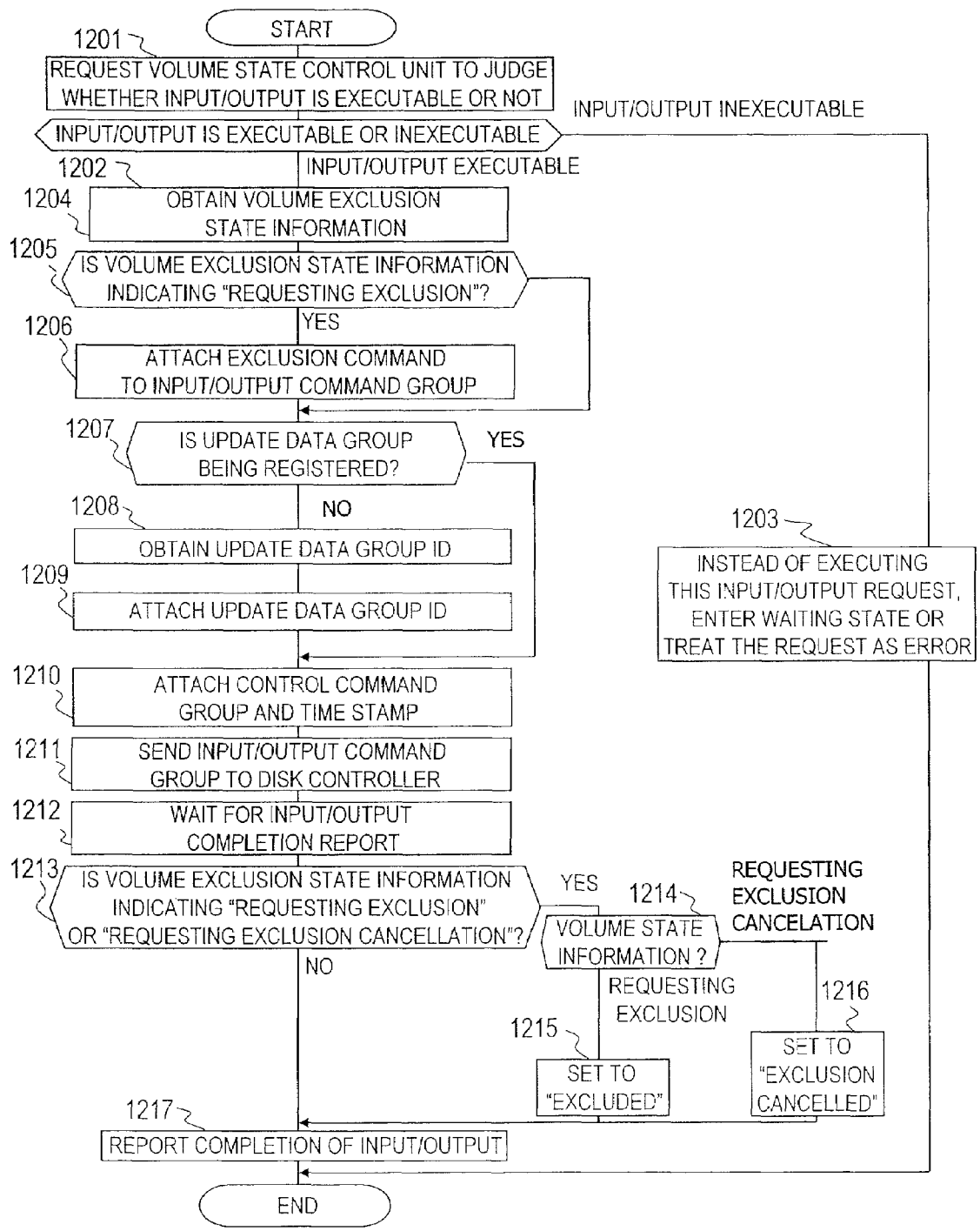
FIG. 21 is a flow chart for processing of the input/output execution control unit according to the first embodiment of this invention.

FIG. 21 is a flow chart for processing of the input/output execution control unit 251.

Prior to execution of an input/output request, the input/output execution control unit 251 requests the volume state control unit 256 to judge whether the input/output request is executable or not (Step 1201) and, from the result of the judging by the volume state control unit 256, determines whether or not the situation allows execution of the input/output request (Step 1202). Judging that the input/output request is inexecutable, the input/output execution control unit 251 enters a waiting state or treats the input/output request as error instead of executing the input/output request (Step 1203).

Judging that the input/output request is executable, the input/output execution control unit 251 requests the volume state control unit 256 to obtain the volume state information 258 (Step 1204). The input/output execution control unit 251 judges whether or not the volume exclusion state information 413 in the obtained volume state information 258 says "requesting exclusion" (Step 1205). When the volume exclusion state information 413 is set to "requesting exclusion", the input/output execution control unit 251 attaches a volume exclusion command to an input/output command group handed from the data access control unit (Step 1206).

The input/output execution control unit 251 next judges whether the update data group registration state information 403 says "registering an update data group" or not (Step 1207). When the update data group registration state information 403 is not set to "registering an update data group", the input/output execution control unit 251 obtains the update data group ID 402 set in the volume state information 258 (Step 1208), and attaches the obtained update data group ID to the input/output command group (Step 1209).

Then the input/output execution control unit 251 attaches, to the input/output command group, a command control group necessary for volume control and a time stamp (Step 1210), and sends the input/output command group to the disk controller (Step 1211).

After sending the input/output command group to the disk controller, the input/output execution control unit 251 waits for an input/output completion report from the disk controller (Step 1212). Receiving the input/output completion report, the input/output execution control unit 251 judges whether the volume exclusion state information 412 says "requesting exclusion" or "requesting exclusion cancellation" (Step 1213, Step 1214). In the case where the volume exclusion state information 412 has been set to "requesting exclusion", the input/output execution control unit 251 changes the volume exclusion state information 412 to "excluded" (Step 1215). In the case where the volume exclusion state information 412 has been set to "requesting exclusion cancellation", the input/output execution control unit 251 changes the volume exclusion state information 412 to "exclusion cancelled" (Step 1216). Lastly, completion of input/output is reported to the sender of the input/output request (Step 1217).

Figure 22:
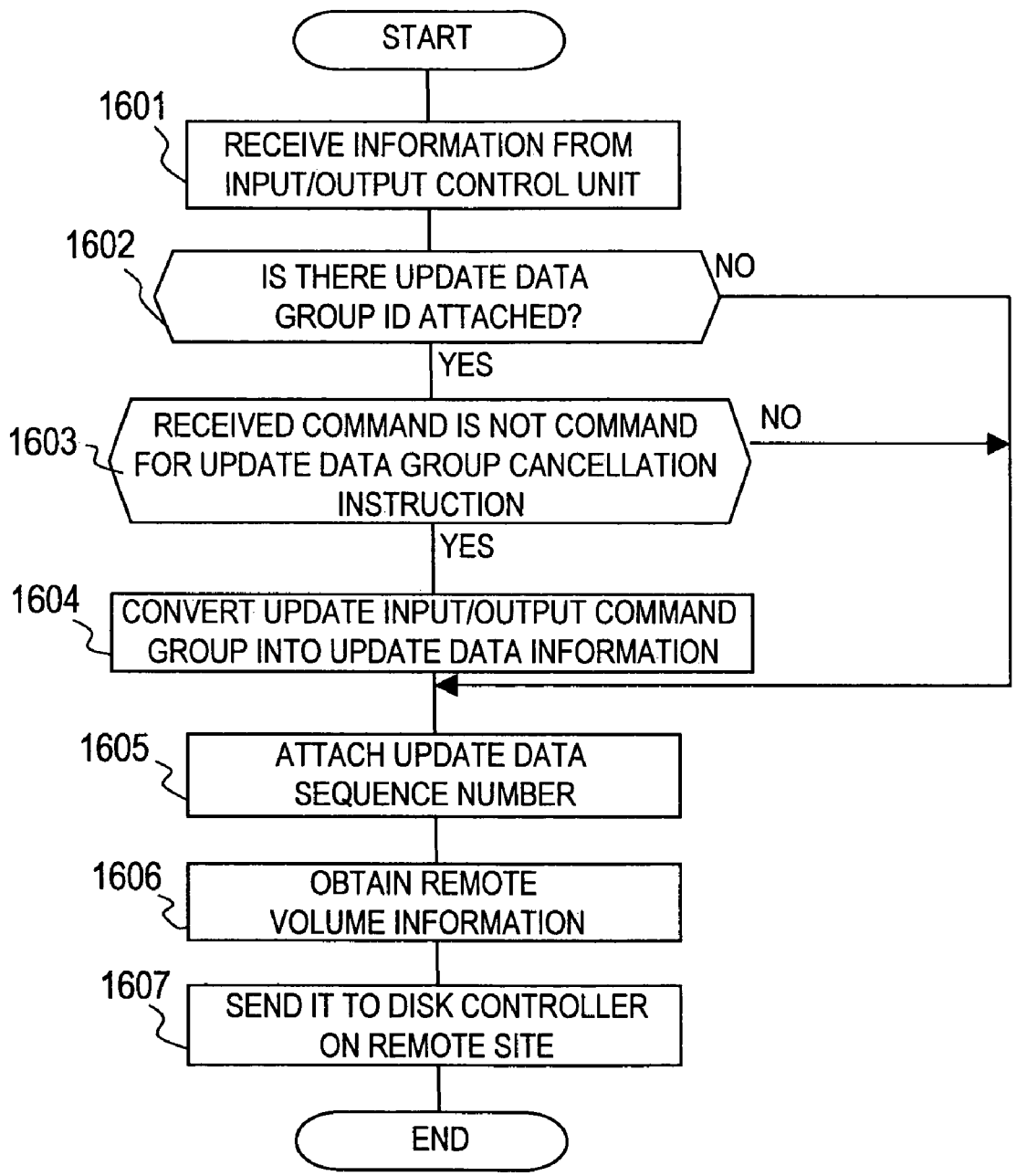
FIG. 22 is a flow chart for processing of a data copy control unit of the main site disk controller according to the first embodiment of this invention.

FIG. 22 is a flow chart for processing of the data copy control unit 1301 of the disk controller 20A, which is on the main site 1.

The data copy control unit 1301 receives a command from the input/output control unit 1311 (Step 1601), and judges whether or not an update data group ID is attached to the received command (Step 1602).

When an update data group ID is attached to the received command, the data copy control unit 1301 checks that the received command is not a command for an update data group cancellation instruction (Step 1603). When it is confirmed that the received command is not a command for an update data group cancellation instruction, the data copy control unit 1301 converts the update input/output command group received from the input/output control unit 1311 into the update data information 1303 (Step 1604). Then the data copy control unit 1301 attaches the update data sequence number 1401, which is managed by the disk controller (Step 1605), obtains the remote volume information 1502 from the volume information management unit 1312 (Step 1606), and sends the information via the input/output reception unit 112 to the disk controller 20B on the remote site 2 (Step 1607).

Figure 23:
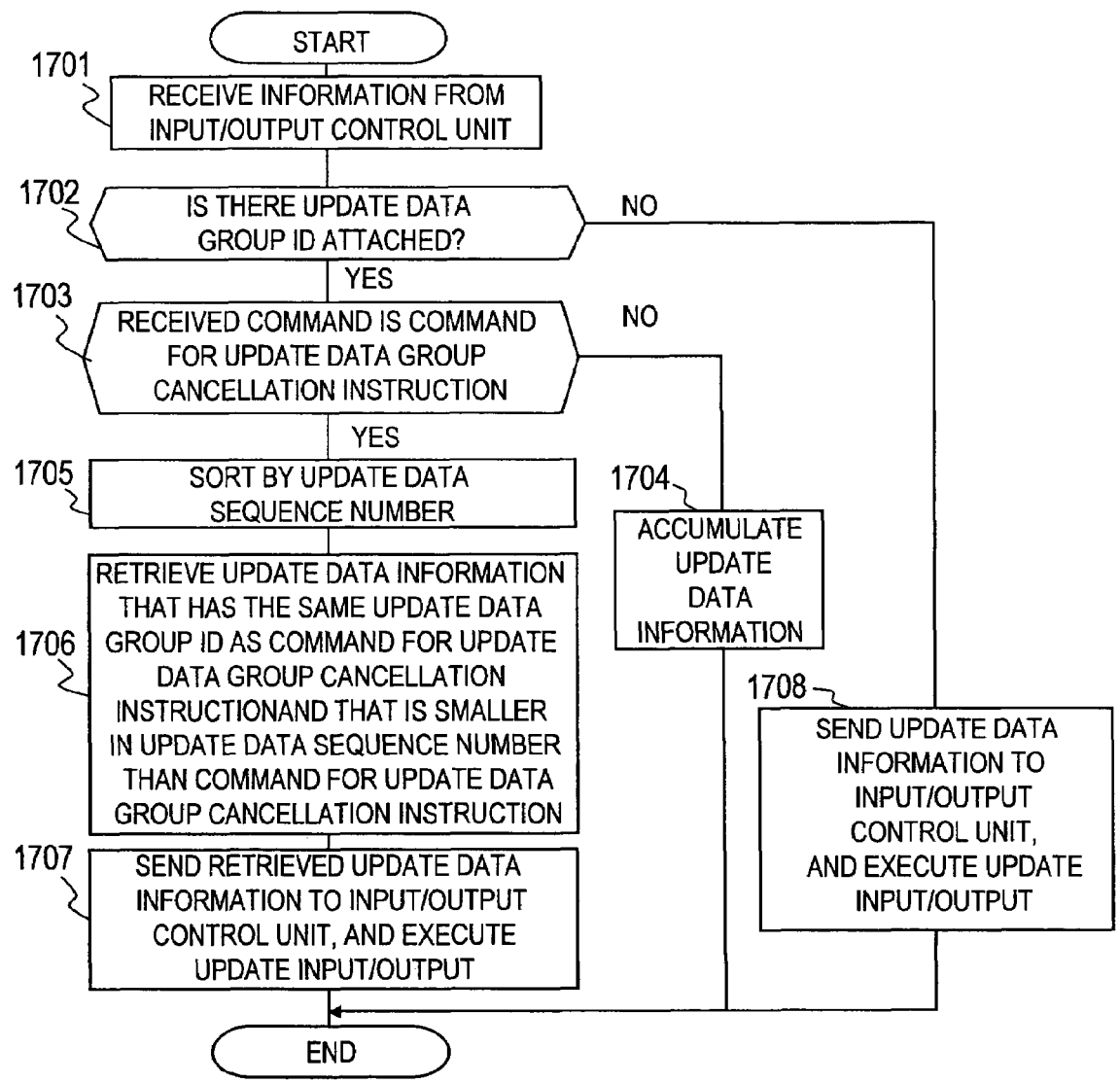
FIG. 23 is a flow chart for processing of a data copy control unit of the remote site disk controller according to the first embodiment of this invention.

FIG. 23 is a flow chart for processing of the data copy control unit 1301 of the disk controller 20B, which is on the remote site 2.

The data copy control unit 1301 receives a command from the input/output control unit 1311 (Step 1701), and judges whether or not an update data group ID is attached to the received command (Step 1702).

When an update data group ID is attached to the received command, the data copy control unit 1301 judges whether or not the received command is a command for an update data group cancellation instruction (Step 1703). In the case where the received command is not a command for an update data group cancellation instruction, the update data information 1303 is accumulated in the data buffer unit 1302 (Step 1704).

In the case where the received command is a command for an update data group cancellation instruction, the data copy control unit 1301 arranges the update data information 1303 accumulated in the data buffer unit 1302 in the order of update data sequence number (sorts the accumulated update data information 1303 by update data sequence number) (Step 1705).

The data copy control unit 1301 next searches the data buffer unit 1302 for update data information that has the same update data group ID as the command for an update data group cancellation instruction and that has a smaller update data sequence number than the one attached to the command for an update data group cancellation instruction (Step 1706). The data copy control unit 1301 sends the update data information 1303 that is found as a result of the search to fulfill the conditions to the input/output control unit 1311, and a data update is executed (Step 1707).

When it is judged in Step 1702 that an update data group ID is not attached to the received command, the data copy control unit 1301 sends update data information to the input/output control unit and a data update is executed (Step 1708).

Normal remote copy is executed when there is no update data group ID attached.

Figure 24:
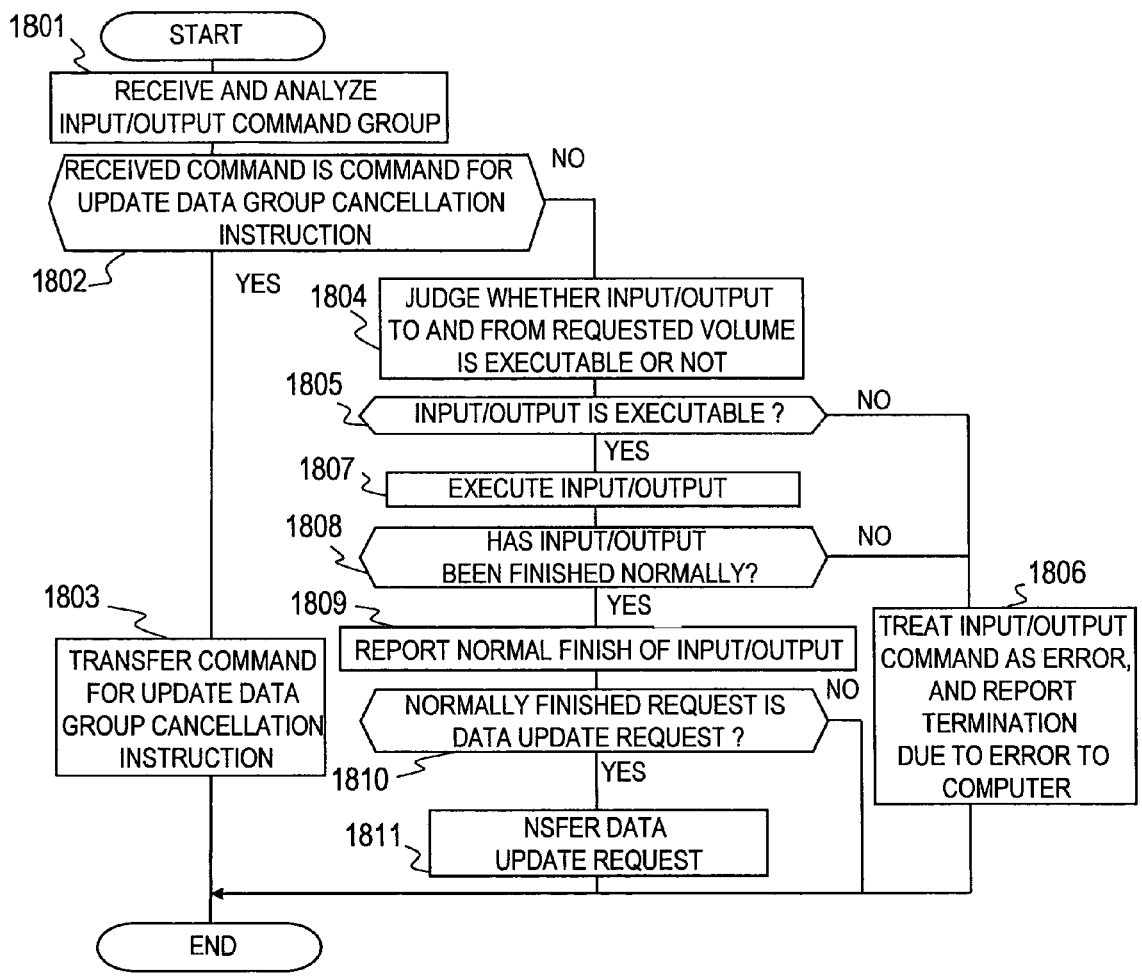
FIG. 24 is a flow chart for processing of an input/output control unit of the main site disk controller according to the first embodiment of this invention.

FIG. 24 is a flow chart for processing of the input/output control unit 1311 of the main site disk controller 20A.

The input/output control unit 1311 receives a command and analyzes the command (Step 1801) to judge whether or not the received command is a command for an update data group cancellation instruction (Step 1802).

In the case of a command for an update data group cancellation instruction, the input/output control unit 1311 sends the command for an update data copy cancellation instruction to the data copy control unit 1301 (Step 1803).

In the case where the received command is not a command for an update data group cancellation instruction, the input/output control unit 1311 judges from the volume information 1313 whether input/output of data in a volume designated by the received command is executable or not (Step 1804) and determines whether or not the input/output is executable (Step 1805).

Judging that the input/output is inexecutable, the input/output control unit 1311 treats the input/output request as error, and reports to the host computer termination of the processing due to error (Step 1806).

Judging that the input/output is executable, the input/output control unit 1311 executes input/output of data in the volume that is designated by the received command (Step 1807). Then the input/output control unit 1311 waits for completion of execution of the input/output, and judges whether or not the input/output is finished normally (Step 1808).

When the input/output is finished abnormally, the input/output control unit 13311 treats the input/output request as error, and reports to the host computer termination of the processing due to error (Step 1806).

When the input/output is finished normally, the input/output control unit 1311 reports that fact to the host computer 10A (Step 1809). The input/output control unit 1311 then judges whether the request that has normally finished being processed is a data update request or not (Step 1810). In the case of a data update request, the input/output control unit 1311 sends the data update request to the data copy control unit 1301 (Step 1811).

Figure 25:
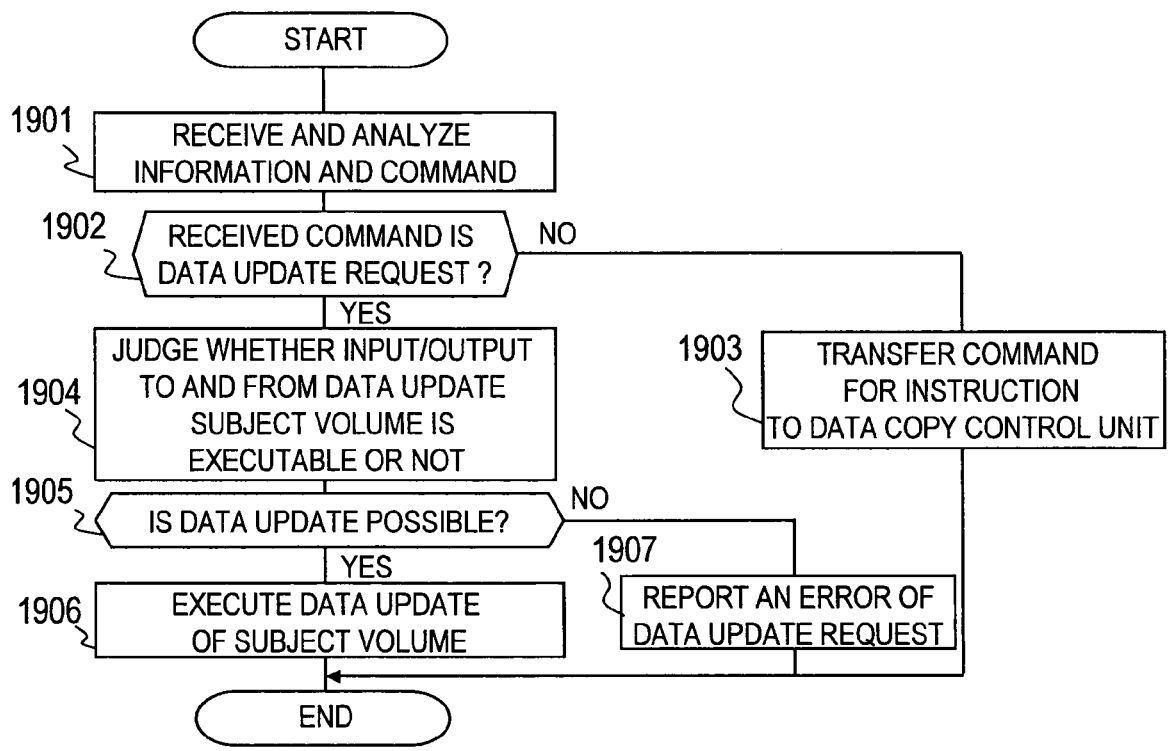
FIG. 25 is a flow chart for processing of an input/output control unit of the remote site disk controller according to the first embodiment of this invention.

FIG. 25 is a flow chart for processing of the input/output control unit 1311 of the disk controller 20B, which is on the remote site 2.

The input/output control unit 1311 receives update data information and a command for an update data group cancellation instruction from the input/output reception unit 112 or the data copy control unit 1301, and analyzes the command (Step 1901). Through the analysis, the input/output control unit 1311 judges whether or not the received request/command is a data update request sent from the data copy control unit 1301 (Step 1902).

When the received command is not a request from the data copy control unit 1301, the input/output control unit 1311 sends the command and the update data information to the data copy control unit 1301 (Step 1903).

When the received command is a data update request from the data copy control unit 1301, the input/output control unit 1311 judges from the volume information 1313 whether input/output to/from a volume whose data is requested to be updated is executable or not (Step 1904), and determines whether or not the data update is possible (Step 1905).

When the data update is possible, the input/output control unit 1311 executes the data update of the requested volume (Step 1906). When the data update is not possible, on the other hand, the input/output control unit 1311 reports an error of the data update request (Step 1907).

Figure 26:
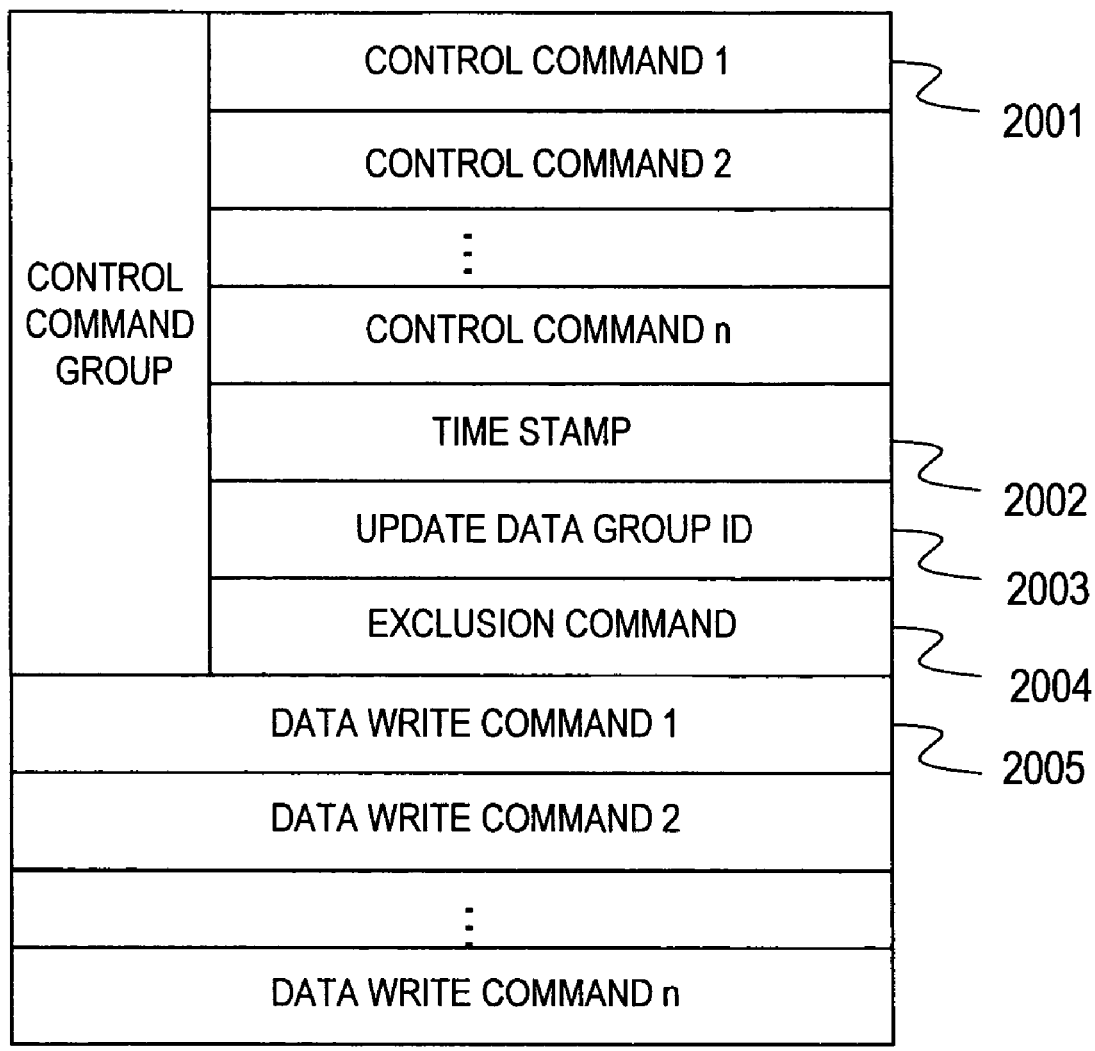
FIG. 26 is a diagram showing an example of a command group sent from the host computer to the disk controllers according to the first embodiment of this invention.

FIG. 26 shows an example of a command group that the host computer 10A sends to the disk controller 20A upon reception of an update input/output request.

The command group contains a control command group and a plurality of data write commands 2005. The control command group contains one or more control commands 2001 as instructions to the disk controller 20A, a time stamp 2002 associated with the control command 2001 and, when necessary, an update data group ID 2003 and an exclusion command 2004.

As has been described, in the first embodiment of this invention, the host computer 10A on the main site 1 requests the disk controller 20A to input/output data stored in the primary volume 121 of the disk unit 30A. Information indicating to which group update data belongs (an update data group ID) is attached to the input/output request, to thereby set a data range that is valid to the host computer 10A. The disk controller 20B on the remote site 2 temporarily accumulates request data pieces that have the same update data group ID to store the accumulated request data pieces at once in the secondary volume 181 upon reception of a reflection request. In this way, data is reflected on the secondary volume per data unit that is valid to the host computer 10A. Thus, when a failure occurs on the main site 1, service can be resumed quickly by using data stored in the secondary volume 181 on the remote site 2, and the failure is prevented from causing more than minimum data fault or volume fault.

Second Embodiment

A second embodiment of this invention will be described next.

In a computer system according to the second embodiment, an input/output control component of the disk controller 20A on the main site 1 is given the functions of the update data group control unit 255 and the update data group management unit 253, which, in the first embodiment described above, are contained in the input/output execution management program 104 of the host computer 10A.

Whereas an update data group is set by an instruction from software of the host computer 10A in the computer system of the first embodiment, the second embodiment uses the disk controller 20 to set an update data group.

Configurations of the second embodiment that are common to the first embodiment are denoted by the same symbols and explanations thereof will be omitted here.

Figure 27:
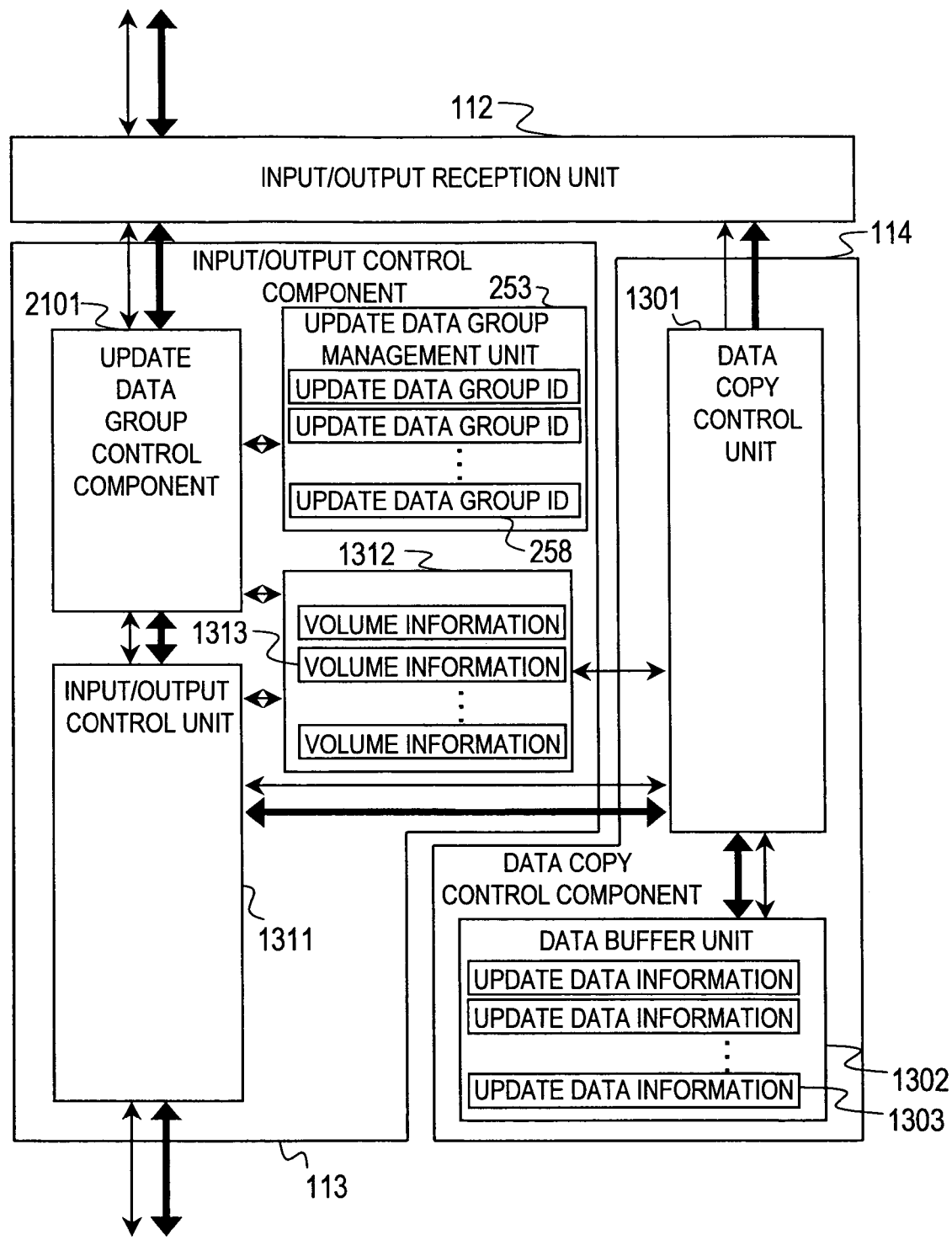
FIG. 27 is a function block diagram of a computer system according to a second embodiment of this invention.

FIG. 27 is a function block diagram of the computer system according to the second embodiment.

The input/output control component 113 contains an update data group control component 2101, which executes a function corresponding to that of the above-described update data group control unit 255, and the update data group management unit 253.

The update data group control component 2101 receives a command via the input/output reception unit 112. The update data group control component 2101 judges whether or not the received command is a volume exclusion/exclusion cancellation command. When the received command is an exclusion/exclusion cancellation command, the update data group control component 2101 requests the update data group management unit 253 to obtain or return the update data group ID 259 as needed.

The update data group control component 2101 sets an update data group ID in the volume information 1313 of the volume information management unit 1312, and removes an update data group ID from the volume information 1313.

When the received command is an exclusion cancellation command, the update data group control component 2101 creates a command for an update data group cancellation instruction as necessary, and sends the created command to the input/output control unit 1311.

When the received command is other command than a volume exclusion/exclusion cancellation command, the update data group control component 2101 obtains the volume information 1313 of a volume whose data is requested to be inputted/outputted by the command, in order to judge whether to attach an update data group ID to the command. When it is judged as necessary, an update data group ID is attached to the command.

Figure 28:
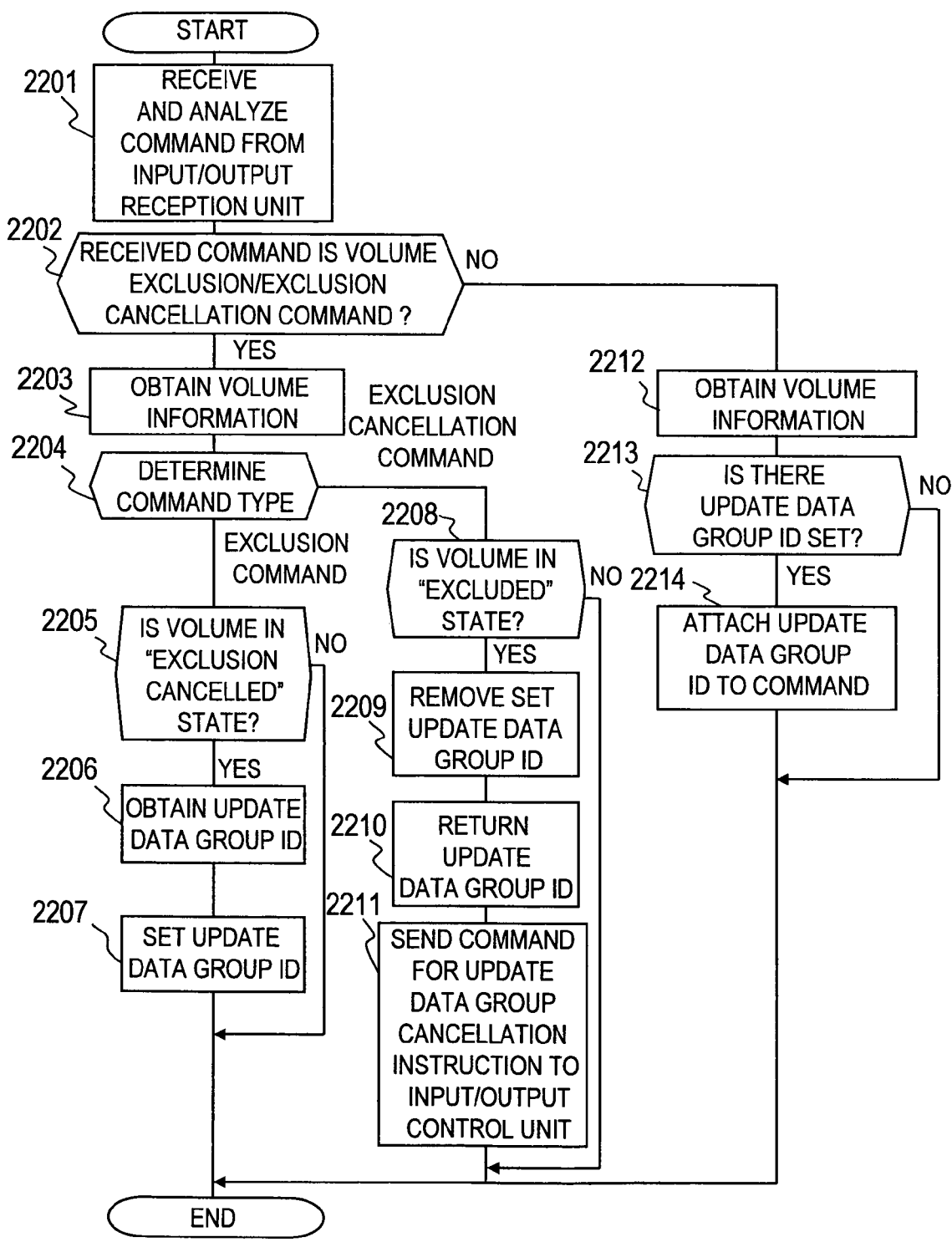
FIG. 28 is a flow chart for processing of an update data group control component according to the second embodiment of this invention.

FIG. 28 is a flow chart for processing of the update data group control component 2101.

The update data group control component 2101 receives a command from the input/output reception unit 112 and analyzes the received command (Step 2201) to judge whether the received command is a volume exclusion/exclusion cancellation command or not (Step 2202).

When the received command is a volume exclusion/exclusion cancellation command, the update data group control component 2101 obtains from the volume information management unit 1312 the volume information 1313 of a volume designated by the command (Step 2203), to thereby determine the type of the command (Step 2204). When the received command is an exclusion command, the update data group control component 2101 judges whether or not the volume exclusion information 1501 in the volume information 1313 is set to "exclusion cancelled", in other words, whether the volume designated by the command has been excluded or not (Step 2205).

In the case where the designated volume has not been excluded, the update data group control component 2101 obtains from the update data group management unit 253 the update data group ID 259 that is not in use (Step 2206). The obtained update data group ID is set in the volume information 1313 by the update data group control component 2101 (Step 2207).

On the other hand, when the received command is found to be an exclusion cancellation command in Step 2204 where the type of the command is determined, the update data group control component 2101 judges whether or not the volume exclusion information 1501 in the volume information 1313 is set to "excluded", in other words, whether the volume designated by the command has been excluded or not (Step 2208).

In the case where the designated volume has been excluded, the update data group control component 2101 removes the update data group ID 259 that has been set in the volume information 1313 (Step 2209). The removed and now unnecessary update data group ID 259 is returned to the update data group management unit 253 by the update data group control component 2101. The update data group control component 2101 then creates a command for an update data group cancellation instruction and sends the created command to the input/output control unit 1311. (Step 2211).

When it is judged in Step 2202 that the received command is not a volume exclusion/exclusion cancellation command, the update data group control component 2101 obtains the volume information 1313 of the volume designated by the command from the volume information management unit 1312 (Step 2212), and judges whether an update data group ID is set in the obtained volume information 1313 (Step 2213). In the case where the volume information 1313 has an update data group ID set therein, the update data group control component 2101 attaches the update data group ID set in the volume information 1313 to the command (Step 2214).

Subsequent processing is the same as in the first embodiment described above.

Through the above processing, the disk controller 20A judges whether to attach an update data group ID to an input/output request received from the host computer 10A. Specifically, it is when the input/output request is a volume exclusion request command that the disk controller 20A attaches an update data group ID to the command for inputting/outputting data to/from a requested volume. This is because data inputted/outputted to a volume while the volume is excluded by the host computer 10A can be deemed as one meaningful data group.

This enables a conventional host computer which sends an input/output request to serve as the host computer 10A without needing to modify the conventional host computer at all. Data in the primary volume 121 can be reflected on the secondary volume 181 per data unit that is valid to the host computer 10A as in the first embodiment by the function of the disk controller 20A. Thus, when a failure occurs on the main site 1, service can be resumed quickly by using data stored in the secondary volume 181 on the remote site 2, and the failure is prevented from causing more than minimum data fault or volume fault.

Third Embodiment

A third embodiment of this invention will be described next.

Figure 29:
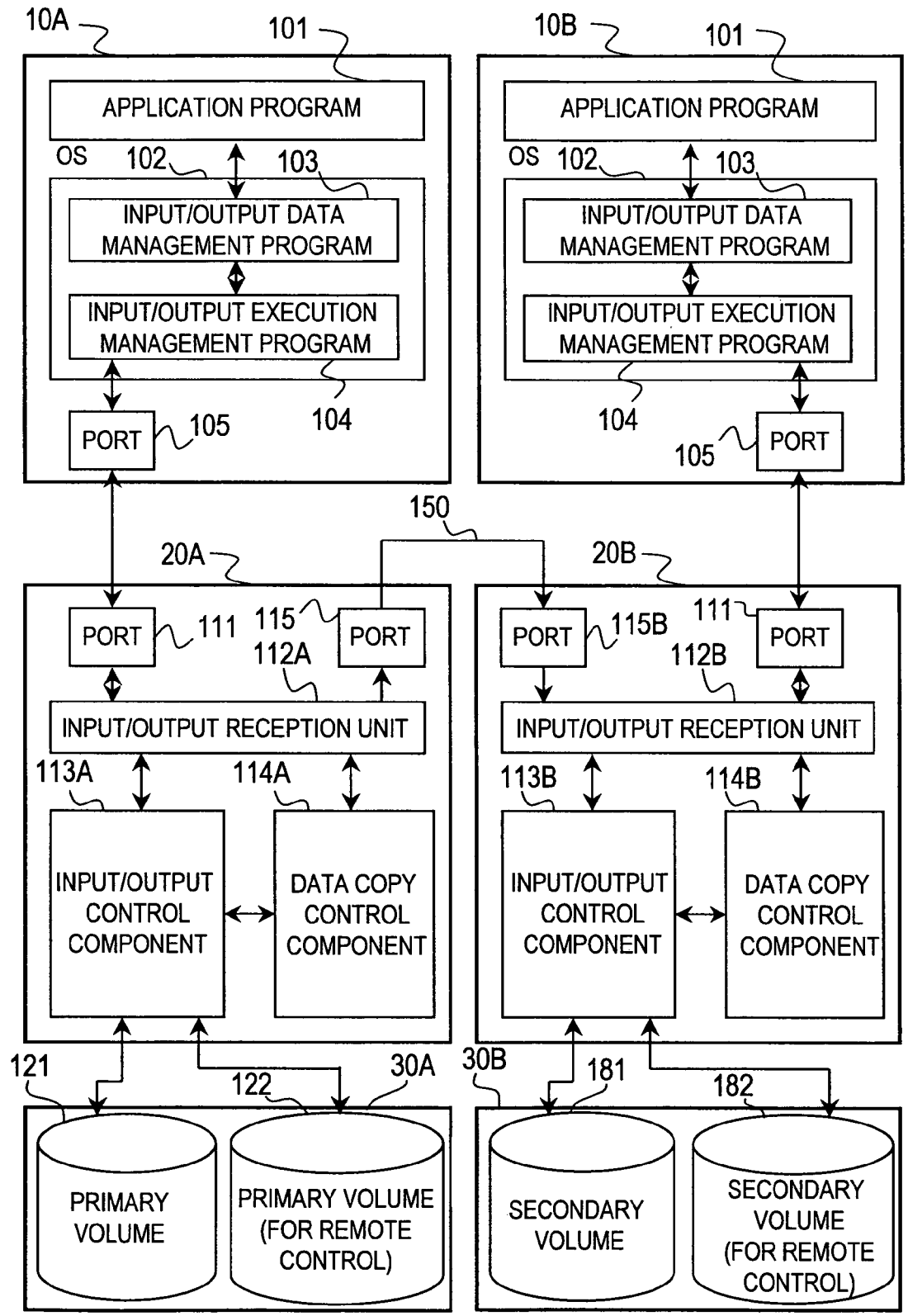
FIG. 29 is a function block diagram of a computer system according to a third embodiment of this invention.

Unlike the first embodiment, a computer system of the third embodiment (FIG. 29) gives the disk units 30A and 30B volumes in which information for controlling the disk controllers 20 is stored (remote control volumes 122 and 182).

Commands received by the disk controllers 20 are written as data in the remote control volumes. The disk controllers 20 consult the data written in the remote control volumes to execute processing dictated by the commands.

Configurations of the third embodiment that are common to the first embodiment are denoted by the same symbols and explanations thereof will be omitted here.

Described below is processing of the computer system according to the third embodiment.

The application program 101 or OS 102 of the host computer 10A creates an input/output request.

The host computer 10A judges at this point whether to treat the created input/output request as an update data group. When the created input/output request needs to be treated as an update data group, an update data group ID is attached to the input/output request.

Then the host computer 10A sends the created input/output request to the disk controller 20A on the main site 1.

The disk controller 20A first executes the sent input/output request to input/output data to/from the primary volume 121. Specifically, when the received input/output request is a data update request, the disk controller 20A updates requested data in a volume designated by the request.

The disk controller 20A next determines the type of the received input/output request. When the input/output request is an update request, the disk controller 20A sends the update input/output request to the disk controller 20B on the remote site.

The disk controller 20B judges whether an update data group ID is attached to the sent update request or not. When there is an update data group ID attached, the update request is stored in the data buffer unit 1302 of the disk controller 20B to accumulate input/output requests with update data group IDs attached thereto. When the update request has no update data group ID attached, the update request is executed to update the secondary volume 181.

The disk controller 20B repeats this processing until every input/output request in the update data group is executed.

After every input/output request in the update data group is executed, the disk controller 20A writes, as data, update data group reflection instruction information in the remote control volume 122. Execution of input/output requests in an update data group is judged as completed upon issuance of an instruction from the host computer, 10A as described in the first or second embodiment, or by the disk controller 20A upon issuance of a volume exclusion cancellation request.

Data written in the remote control volume 122 is copied to the remote control volume 182 on the remote site 2 by the remote copy function.

The data copy control component 114B of the disk controller 20B regularly accesses the remote control volume 182 to check that update data group reflection instruction information is stored in the remote control volume 182.

Instead of regular checking, the data copy control component 114B may check for reflection instruction information only when an update request directed to the remote control volume 182 is issued by monitoring update requests that are executed to update the remote control volume 182.

When there is an update data group reflection instruction stored in the remote control volume 182, the data copy control component 114B obtains an update data group that is designated by the reflection instruction from information accumulated in the data buffer unit 1302. The data copy control component 114B makes the obtained update data group reflected on the secondary volume.

Thus, in the third embodiment of this invention, the target disk controller 20 is instructed by writing data corresponding to a command in a logical volume that is provided for control instead of sending a command to the disk controller 20.

While the present invention has been described in detail and pictorially in the accompanying drawings, the present invention is not limited to such detail but covers various obvious modifications and equivalent arrangements, which fall within the purview of the appended claims.

What is claimed is:

1. A data input/output method executed in a first computer system and a second computer system, the first computer system having: a first disk drive; a first disk controller; and a host computer, the first disk drive having set therein a first logical volume for storing data, the first disk controller having a first control unit for controlling data read/write from/to the first disk drive, a first interface connected to a host computer and to another disk controller, and a first disk interface connected to the first control unit and to the first disk drive, the host computer of the first computer system being connected to the first interface via a network and requesting data input/output to/from the first disk drive, the second computer system having a second disk drive and a second disk controller, the second disk drive having set therein a second logical volume for storing data, the second disk controller having a second control unit for controlling data read/write from/to the second disk drive, a second interface connected to the second control unit and to the first disk controller, and a second disk interface connected to the second disk drive, the method comprising:

a first step of creating data input/output requests;

a second step of judging whether to treat a plurality of said input/output requests as one update data group;

a third step of attaching information to each of the input/output requests, when the input/output requests have been judged to be treated as one update data group, identifying the one update data group to which the input/output requests belong, wherein the update data group information comprises an update data group ID which is unique to each update data group so that each update data group can be distinguished from other update data groups;

a fourth step of sending to the first disk controller the data input/output request requests to/from the logical volume of the first disk drive, by the host computer of the first computer system;

a fifth step of storing, for each of the input/output requests that is an update request, update data requested by the update request in the first logical volume, by the first control unit;

a sixth step of sending the update request to the second disk controller, by the first control unit;

a seventh step of temporarily accumulating in a data buffer in the second disk controller, when said update data group ID indicating the update data group to which the update data belongs is attached to the update request sent from the first control unit, the update data requested by the update request, by the second control unit; and an eighth step of retrieving, when the first control unit determines that the first disk controller has completed executing every data input/output request that is designated by the update data group ID indicating the group to which the update data belongs, the accumulated update data from the data buffer for the update data belonging to the same update data group according to the information indicating as to which update data group the update data belongs, and storing the retrieved update data in the second logical volume, by the first control unit, so that data destruction from interruption of data updating is prevented by executing all of the input/output requests belonging to each update data group as one unit.

2. The data input/output method according to claim 1, wherein the seventh step includes a step of storing by the second control unit, in the second logical volume, update data that is requested by the update request sent from the first control unit, when information indicating the update data group is not attached to the update request.

3. The data input/output method according to claim 1, wherein an application program and an OS is run on the host computer, and wherein the fourth step includes a step of attaching information indicating the update data group to an update request that is made by the application program or by the OS to the first disk controller to update data in the logical volume of the first disk drive.

4. The data input/output method according to claim 1, wherein an application program and an OS is run on the host computer, and wherein the fourth step includes a step of attaching information indicating the update data group to an update request, by the OS, when the OS makes a setting to inhibit other input/output requests from being made to a logical volume that is designated by the update request.

5. The data input/output method according to claim 1, wherein an application program and an OS run on the host computer, and wherein the fourth step includes a step of attaching information indicating the update data group to a received update request, by the first control unit, when the OS requests to make settings to inhibit other input/output requests from being made to a logical volume that is designated by the update request.

6. A computer network system, comprising:

a first computer system which includes:

a first disk drive with one or more logical volumes set to store data;

a first disk controller with a first control unit, a first interface, and a first disk interface, the first control unit having a processor and a memory, the processor controlling data read/write to/from the first disk drive through processing of a program stored in the memory, the first interface being connected to a host computer and to another disk controller, the first disk interface being connected to the first control unit and to the first disk drive; and the host computer of the first computer system being connected to the first interface via a network, the host computer having a processor and a memory to request input/output of data to/from the first disk drive through processing of an application program and an OS that are stored in the memory; and a second computer system which includes:

a second disk drive with one or more logical volumes set to store data; and a second disk controller with a second control unit, a second interface, and a second disk interface, the second control unit having a processor a memory, the processor controlling data read/write to/from the second disk drive through processing of a program stored in the memory, the second interface being connected to the first disk controller, the second disk interface being connected to the second control unit and to the second disk drive, wherein the host computer creates data input/output requests, judges whether to treat a plurality of said input/output requests as one update data group, and attaches information to each of the input/output requests, when the input/output requests are judged to be treated as one update data group, identifying the one update data group to which the input/output requests belong, wherein the update data group information comprises an update data group ID which is unique to each update data group so that each update data group can be distinguished from other update data groups;

wherein the host computer sends the input/output requests to/from a first of the one or more logical volume of the first disk drive to the first disk controller, wherein, for each of the input/output requests that is an update request, the first control unit stores update data requested by the update request in the first logical volume of the first disk drive, and sends the update request to the second disk controller, and wherein, when said update data group ID indicating the update data groups to which the update data belongs is attached to the update request sent from the first control unit, the second control unit temporarily accumulates in a data buffer in the second disk controller the update data requested by the update request and retrieves, when the first control unit determines that the first disk controller has completed executing every data input/output request that is designated by the ID indicating the update data group to which the update data belongs, the accumulated update data from the data buffer for the update data belonging to the same update data group according to the information indicating as to which group the update data belongs, and stores the retrieved update data in the second logical volume, so that data destruction from interruption of data updating is prevented by executing all of the input/output requests belonging to each update data group as one unit.

7. The computer network system according to claim 6, wherein the second control unit stores, in the logical volume of the second disk drive, update data that is requested by the update request sent from the first control unit, when information indicating the update data group is not attached to the update request.

8. The computer network system according to claim 6,
wherein the application program or the OS attaches information indicating the update data group to an update request upon requesting the first disk controller to update data in the logical volume of the first disk drive.

9. The computer network system according to claim 6,
wherein the OS attaches information indicating the update data group to an update request, when making setting to inhibit other input/output requests from being made to a logical volume that is designated by the update request.

10. The computer network system according to claim 6,
wherein the first control unit attaches information indicating the update data group to a received update request when the OS requests to make settings to inhibit other input/output requests from being made to a logical volume that is designated by the update request.

11. A data input/output method executed in a first computer system and a second computer system,
the first computer system having: a first disk drive; a first disk controller; and a host computer, the first disk drive having set therein a first logical volume for storing data and a first control volume for storing a control command, the first disk controller having a first control unit for controlling data read/write in the first disk drive, a first interface connected to a host computer and another disk controller, and a first disk interface connected to the first control unit and to the first disk drive, the host computer of the first computer system being connected to the first interface via a network to request data input/output to/from the first disk drive,
the second computer system having a second disk drive and a second disk controller, the second disk drive having set therein a second logical volume for storing data and a second control volume for storing a control command, the second disk controller having a second control unit for controlling data read/write from/to the second disk drive, a second interface connected to the second control unit and to the first disk controller, and a second disk interface connected to the second disk drive,
the method comprising:
a first step of creating data input/output requests;
a second step of judging whether to treat a plurality of said input/output requests as one update data group;
a third step of attaching information to each of the input/output requests, when the input/output requests have been judged to be treated as one update data group, identifying the one update data group to which the input/output requests belong, wherein the update data group information comprises an update data group ID which is unique to each update data group so that each update data group can be distinguished from other update data groups;
a fourth step of sending to the first disk controller the data input/output request requests to/from the logical volume of the first disk drive, by the host computer of the first computer system;
a fifth step of storing, when a control command stored in the first control volume is an update request, update data requested by the update request in the first logical volume, by the first control unit;
a sixth step of storing the update request in the second control volume via the second disk controller, by the first control unit;
a seventh step of temporarily accumulating in a data buffer in the second disk controller, when said update data group ID indicating the update data group to which the update data belongs is attached to the update request in the second control volume, the update data that is requested by the update request stored in the second control volume, by the second control unit;
an eighth step of storing information indicating completion of execution, by the first control unit, in the second control volume when the first disk controller completes executing every data input/output request that is designated by the update data group ID indicating the group to which the update data belongs; and
a ninth step of retrieving, when the first control unit determines that the first disk controller has completed executing every data input/output request that is designated by the update data group ID indicating the group to which the update data belongs is detected from the information stored in the second control volume, the accumulated update data from the update buffer for the update data belonging to the same update data group according to the information indicating as to which update data group the update data belongs, and storing the retrieved update data in the second logical volume, by the second control unit,
so that data destruction from interruption of data updating is prevented by executing all of the input/output requests belonging to each update data group as one unit.

12. The data input/output method according to claim 11,
wherein the seventh step includes a step of storing by the second control unit, in the second logical volume, update data that is requested by the update request sent from the first control unit, when information indicating the update data group is not attached to the update request.

13. The data input/output method according to claim 11,
wherein an application program and an OS run on the host computer, and
wherein the fourth step includes a step of attaching information indicating the update data group to an update request that is made by the application program or by the OS to the first disk controller to update data in the logical volume of the first disk drive.

14. The data input/output method according to claim 11,
wherein an application program and an OS run on the host computer, and
wherein the fourth step includes a step of attaching information indicating the update data group to an update request, by the OS, when the OS makes settings to inhibit other input/output requests from being made to a logical volume that is designated by the update request.

15. The data input/output method according to claim 11,
wherein an application program and an OS are run on the host computer, and
wherein the fourth step includes a step of attaching, by the first control unit, information indicating the update data group to an update request that is stored in the first control volume when the OS requests to make settings to inhibit other input/output requests from being made to a logical volume that is designated by the update request.

16. A computer network system, comprising:
a first computer system which includes:
- a first disk drive with a first logical volume and a first control volume set therein, the first logical volume storing data, the first control volume storing a control command;
- a first disk controller with a first control unit, a first interface, and a first disk interface, the first control unit having a processor and a memory, the processor controlling data read/write to/from the first disk drive through processing of a program stored in the memory, the first interface being connected to a host computer and to another disk controller, the first disk interface being connected to the first control unit and to the first disk drive; and
- the host computer connected to the first interface via a network, the host computer having a processor and a memory to request input/output of data to/from the first disk drive through processing of an application program and an OS that are stored in the memory; and a second computer system which includes:
- a second disk drive with a second logical volume and a second control volume set therein, the second logical volume storing data, the second control volume storing a control command; and
- a second disk controller with a second control unit, a second interface, and a second disk interface, the second control unit having a processor and a memory, the processor controlling data read/write to/from the second disk drive through processing of a program stored in the memory, the second interface being connected to the first disk controller, the second disk interface being connected to the second control unit and to the second disk drive, wherein the host computer creates data input/output requests, judges whether to treat a plurality of said input/output requests as one update data group, and attaches information to each of the input/output requests, when the input/output requests have been judged to be treated as one update data group, identifying the one update data group to which the input/output requests belong, wherein the update data group information comprises an update data group ID which is unique to each update data group so that each update data group can be distinguished from other update data groups;

wherein the host computer sends the input/output requests to/from the first logical volume to the first disk controller, wherein, for each of the input/output requests that is an update request, the first control unit stores update data requested by the update request in the logical volume of the first disk drive, and sends the update request to the second disk controller, wherein the first control unit stores an information indicating completion of execution in the second control volume after the first disk controller completes executing every data input/output request that is designated by the update data group ID indicating to which update data group the update data belongs, wherein, when information indicating the group to which the update data belongs is attached to an update request stored in the second control volume, the second control unit temporarily accumulates in a data buffer in the second disk controller update data requested by the update request, and wherein the second control unit retrieves, when the first control unit determines that the first disk controller has completed executing every data I input/output request that is designated by the ID indicating the update data group to which the update data belongs is detected from the information stored in the second control volume, the accumulated update data from the data buffer for the update data belonging to the same update data group according to ID indicating as to which update data group the update data belongs and stores the retrieved update data in the second logical volume, so that data destruction from interruption of data updating is prevented by executing all of the input/output requests belonging to each update data group as one unit.

17. The computer network system according to claim 16, wherein the second control unit stores, in the logical volume of the second disk drive, update data that is requested by the update request sent from the first control unit, when information indicating the update data group is not attached to the update request.

18. The computer network system according to claim 16, wherein the application program or the OS attaches information indicating the update data group to an update request when requesting the first disk controller to update data in the logical volume of the first disk drive.

19. The computer network system according to claim 16, wherein the OS attaches information indicating the update data group to update request when making settings to inhibit other input/output requests from being made to a logical volume that is designated by the update request.

20. The data input/output method according to claim 16, wherein the first control unit attaches information indicating the update data group to a received update request when the OS requests to make settings to inhibit other input/output requests from being made to a logical volume that is designated by the update request.

* * * * *